US007848745B2

(12) United States Patent
Hasegawa et al.

(10) Patent No.: US 7,848,745 B2
(45) Date of Patent: *Dec. 7, 2010

(54) RADIO ACCESS POINT TESTING METHOD AND TESTING APPARATUS

(75) Inventors: Yoshiaki Hasegawa, Yokohama (JP); Shinya Oota, Yokohama (JP); Yoshihiro Kanomata, Yokohama (JP); Arata Nakagoshi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/706,145

(22) Filed: Feb. 16, 2010

(65) Prior Publication Data

US 2010/0144339 A1    Jun. 10, 2010

Related U.S. Application Data

(63) Continuation of application No. 12/073,382, filed on Mar. 5, 2008, now abandoned, which is a continuation of application No. 10/910,583, filed on Aug. 4, 2004, now Pat. No. 7,366,508.

(30) Foreign Application Priority Data

Nov. 17, 2003    (JP)    ............................. 2003-386193

(51) Int. Cl.
 *H04W 24/00* (2009.01)
(52) U.S. Cl. .................... 455/423; 455/424; 455/67.11; 455/115.1; 455/561; 455/226.1; 370/328
(58) Field of Classification Search ................. 455/424, 455/423, 67.11, 115.1, 226.1, 561, 552.1, 455/553.1; 370/328
See application file for complete search history.

(56) References Cited

U.S. PATENT DOCUMENTS

| 5,710,984 | A |   | 1/1998 | Millar et al. |
|---|---|---|---|---|
| 5,930,707 | A | * | 7/1999 | Vambaris et al. ............ 455/424 |
| 6,094,577 | A | * | 7/2000 | Han .......................... 455/424 |
| 6,128,474 | A |   | 10/2000 | Kim et al. |
| 6,131,020 | A |   | 10/2000 | Oja et al. |
| 6,151,482 | A | * | 11/2000 | Eriksson .................. 455/67.11 |
| 6,289,216 | B1 |   | 9/2001 | Koh et al. |
| 6,308,065 | B1 |   | 10/2001 | Molinari et al. |
| 6,310,579 | B1 |   | 10/2001 | Meredith |
| 6,453,152 | B1 | * | 9/2002 | Hong et al. ............... 455/67.11 |
| 6,766,164 | B1 | * | 7/2004 | Funk et al. .................. 455/423 |

(Continued)

FOREIGN PATENT DOCUMENTS

JP    11154903    6/1999

*Primary Examiner*—Kamran Afshar
*Assistant Examiner*—Babar Sarwar
(74) *Attorney, Agent, or Firm*—Brundidge & Stanger, P.C.

(57) ABSTRACT

The normality verification and radio characteristics test of a radio communication system are executed. RF-SWs (radio-frequency coaxial switches) change-over the paths of signals which are transmitted to and received from an access terminal function portion included in an access point. RF-SWs connect the access terminal function portion 122 with a desired one of radio analog portions. A test function controller controls the changeover operations of the RF-SWs in accordance with information designated by a maintenance apparatus (OMC). An access point controller controls in accordance with received test sort information, one or more of (1) an antenna failure test, (2) a receiver failure test, and (3) a transmitter failure.

6 Claims, 14 Drawing Sheets

U.S. PATENT DOCUMENTS

| | | |
|---|---|---|
| 6,812,885 B2 | 11/2004 | Brettner, III et al. |
| 7,353,020 B2 | 4/2008 | Hasegawa et al. |
| 7,366,508 B2 | 4/2008 | Hasegawa et al. |
| 2002/0119772 A1 | 8/2002 | Yoshida |
| 2004/0152431 A1* | 8/2004 | Johnson ..................... 455/130 |
| 2005/0176375 A1 | 8/2005 | Bednasz et al. |
| 2005/0202859 A1* | 9/2005 | Johnson et al. .......... 455/575.7 |
| 2006/0274657 A1 | 12/2006 | Olgaard et al. |
| 2008/0139198 A1 | 6/2008 | Saitou |
| 2008/0160919 A1 | 7/2008 | Hasegawa et al. |

* cited by examiner

RADIO ACCESS POINT TESTING METHOD AND TESTING APPARATUS

The present application is a continuation of application Ser. No. 12/073,382, filed Mar. 5, 2008 now abandoned; which is a continuation of application Ser. No. 10/910,583, filed Aug. 4, 2004, now U.S. Pat. No. 7,366,508, the contents of which are incorporated herein by reference.

The present invention relates to a radio access point testing method and testing apparatus, and more particularly to a radio access point testing method and testing apparatus which permit the radio characteristics test of a radio access point apparatus in a mobile communication system by remote manipulation from an operation center.

Nowadays, mobile communication terminals have become smaller in size and lower in price with the miniaturizations of components, and the number of the users of the mobile communication terminals, such as portable telephones and personal handy system (PHS) telephones, have increased explosively. With the increase in the number of the users, enhancement in convenience has been more required of each system, and the enlargement of a service area and the rise of a data transmission rate have been furthered. The stability of the system is one of important factors for the convenience of the users. For the purpose of stably operating the system, it is important to prevent the occurrence of any failure leading to system shutdown, and simultaneously to quickly detect any failure having occurred and resume system operations.

The mobile communication system has a large service area divided into a large number of small areas called "cells", and includes radio access point apparatuses arranged in the respective cells. The radio access point apparatuses are connected to a network, and a user access terminal communicates through a radio channel with the radio access point apparatus of the cell to which the access terminal belongs, whereby it is permitted to communicate with another access terminal connected to the network.

Regarding failure detection means for the system, the failure of especially the radio interface portion of the radio access point apparatus is difficult of detection because of the uncertain interface of the very radio channel. By way of example, in a case where the antenna of the radio access point apparatus has damaged, it is difficult to immediately judge the damage as the failure of the radio access point apparatus, even at the cutoff of the communication with the user access terminal. On this occasion, such various causes are considered that the particular user will not actually exist in the cell, and that an interference wave will exist in a radio zone connected with the user access terminal, to make the communication impossible.

Means for detecting, for example, an antenna failure is disclosed as a first prior-art example for detecting the failure of the radio access point apparatus (refer to, for example, Patent Document 1: JP-A-5-14291). The antenna failure detector disclosed in Patent Document 1 is shown in FIG. 13. Referring to the figure, the output signal of the power amplifier 1 of a transmitter is passed through a directional coupler 2 as well as a circulator 3 and is transmitted from an antenna 4. Part of the output signal of the power amplifier 1 is inputted from the coupling node of the directional coupler 2 to a first detector 5, thereby to be converted into a detection voltage. A second detector 6 is connected to the node of the circulator 3 other than the nodes thereof connected to the constituents 2 and 4, and it converts reflection power from the antenna 4 into a detection voltage. The detection voltages outputted from the respective detectors are converted into a differential voltage by a subtractor 7, and the differential voltage is inputted to a comparator 8 so as to be compared with a reference voltage.

The prior-art example is means for giving an alarm with the reference voltage of the comparator 8 as a threshold voltage, thereby to permit the failure detection of the antenna 4. More specifically, in a case where the antenna 4 has damaged, a voltage surface wave ratio (VSWR) degrades to increase the reflection power from the antenna 4, and hence, the difference between the detection voltages of the detectors 5 and 6 changes. When the relationship between the magnitudes of the detection voltage difference and the reference voltage being the threshold voltage has been inverted, the output of the comparator 8 changes, and the failure of the antenna 4 can be detected. Recently, a product in which the same functions as in the above are modularized is available, and the antenna failure detection is possible.

With the first prior-art example explained above, the antenna failure can be detected, but receiver defects cannot be detected. Another problem is that, in case of a reception-only antenna or the like, an antenna failure cannot be detected.

A testing method and apparatus are disclosed as a second prior-art example for permitting tests which cover even the normalities of an access point apparatus and a network. Herein, the access point apparatus and the network are tested in such a way that test information, which is transmitted by a radio channel through the network and an access point from an operation center connected to the network including the radio access point apparatus, is received by the testing apparatus (mobile access terminal) (refer to, for example, Patent Document 2: JP-A-2000-332674 and Patent Document 3: JP-A-2002-271280).

The testing apparatus disclosed in Patent Document 2 is shown in FIG. 14. Referring to the figure, a maintenance engineer in an operation center dials from a fixed telephone set 20 the telephone number of a portable telephone 19 which is connected with an access-point radio apparatus 17 to-be-tested. A call reception sequence is executed between the access-point radio apparatus 17 and the portable telephone 19, whereby the line of the fixed telephone set 20 is connected with the portable telephone 19 having an automatic offhook function. The portable telephone 19 plays back a stored vocal message after automatic offhook, and the maintenance engineer listens to the vocal message at the handset of the fixed telephone set 20. After the maintenance engineer has listened to the played-back message, he/she transmits voice from the fixed telephone set 20, and the portable telephone 19 records the voice. Besides, the maintenance engineer transmits a predetermined PB signal from the fixed telephone set 9. Upon receiving the PB signal, the portable telephone 19 plays back and transmits the recorded voice, to which the maintenance engineer can listen at the fixed telephone set 20.

If the access-point radio apparatus 17 is normal, both the vocal message stored in the portable telephone 19 and the maintenance engineers voice recorded and played back by the portable telephone 19 can be heard. However, in a case where a radio reverse link has any abnormality, the maintenance engineer cannot hear the recorded voice. Also, in a case where a radio forward link has any abnormality, he/she cannot hear the vocal message. The prior-art example permits the normality test for the access-point radio apparatus in the above way. Besides, Patent Document 3 contains a testing method similar to that of Patent Document 2 as is expanded to a normality verifying method for a packet-data call processing function.

With the second prior-art example explained above, the normality of the access-point radio apparatus can be verified, but an antenna failure cannot be detected. Another problem is that the verifiable normality is merely the propriety of communication, and that a radio characteristics change, such as the degradation of a reception performance attendant upon a failure of slight degree, cannot be quantitatively decided.

A third prior-art example for quantitatively deciding radio characteristics is a technique wherein any abnormal part in a receiver within a radio access point apparatus is judged from electric power (refer to, for example, Patent Document 4: JP-A-11-154903). Patent Document 4, however, contains nothing about a normality test for communication and discloses an abnormality detecting method for the receiver.

As stated above, it is an actual situation that a decisive comprehensive testing method which covers the antenna failure detection to the access-point radio performance test, and a decisive testing apparatus which serves to realize them, have not been available as the testing method for the radio access point apparatus and the failure detection means.

When the radius of each individual cell is set at about 2 km, the mobile communication system requires about 10,000 access point apparatuses in order to offer a communication service over, for example, the whole of Japan. The bestowal of redundant setups on all the access point apparatuses increases a system constructing cost, and drastically spoils economy. Nevertheless, when the service is interrupted by any failure, a service quality lowers for users, and also a business company offering the service suffers the drawback of being incapable of accounting, so that the service interruption ascribable to the occurrence of the failure must be avoided to the utmost. Accordingly, inexpensive means adapted for the preventive maintenance of the system against failures is eagerly requested. Since, however, the interface between user access terminals and a radio access point is a radio channel in the mobile communication system, a communication quality changes depending upon an environment which surrounds a mobile access point or a fixed access point, and it is very difficult to decide whether an inferior communication quality is ascribable to the apparatus failure or the surrounding environment.

Now, the reasons why the failure detection of the radio access point apparatus is difficult will be concretely explained by taking as an example a case where an access point which steadily has a small number of connected access terminals is existent.

The phenomenon that the number of connected access terminals is steadily small, can sufficiently take place even when the radio access point apparatus is normal. It arises in a case, for example, where the radio access point of another system exists in the neighborhood of the radio access point apparatus. When an interference wave from the radio access point of the other system is inputted, it becomes difficult to detect a reception signal from the mobile access terminal of the pertinent system. This situation is equivalent to the reduction of the area of forward links, and the number of connectable access terminals decreases.

On the other hand, the phenomenon is considered to be ascribable to the failure of the radio access point apparatus. Examples of the failure of the radio access point apparatus will be enumerated below.

The first failure example is an antenna failure. It is considered that signal power from the access point as is received by access terminals, and signal power from the access terminals as is received by the access point will have lowered drastically, resulting in the reduction of a communicable area and the decrease of the number of connected access terminals.

The second failure example is a receiver failure. By way of example, when one receiver has undergone the failure in an access terminal which implements diversity reception by installing a plurality of receivers, a reception performance degrades. It is accordingly considered that the area of forward links has been reduced to decrease the number of connected access terminals.

The third failure example is a transmitter failure. It is considered that the signal quality of reverse links will have degraded due to the transmitter failure of the access point, and that access terminals will communicate with the neighboring access point of good signal quality, resulting in the decrease of the number of connected access terminals.

In this manner, in the mobile communication system, the same phenomena as in the failure occurrences (for example, the small number of connected access terminals) may highly possibly be observed in spite of the normal operation of the system itself, and various causes are considered for the failures, so that the failure detection is very difficult.

When it is intended to detect the above failure examples by the prior-art failure detection means, problems as stated below are involved.

With the technique which is contained in Patent Document 1 cited as the first prior-art example, the first failure example is detectable, but the cases caused by the other failure examples are undetectable. Besides, it is the propriety of communication that can be verified in the technique which is contained in Patent Documents 2 and 3 cited as the second prior-art example. Accordingly, this technique cannot detect the case of a failure which permits the communication, but which degrades the radio quality, as in the above failure example. Further, the technique which is contained in Patent Document 4 cited as the third prior-art example cannot detect the first failure example and the third failure example. Moreover, since only the decision based on the power is rendered, even the receiver failure being the second failure example cannot be detected in the case of, for example, a reception quality degradation ascribable to a phase characteristics degradation.

As thus far explained, it is the actual situation that comprehensive techniques are not available as the failure detection means and testing method for the radio access point apparatus. For the purpose of correctly estimating failure contents, it is desired to comprehensively test various failures supposed. However, the interruption of the service for the test is the lowering of serviceability as viewed from the users and must be avoided to the utmost. Besides, in the mobile communication system, especially in a portable telephone system of CDMA format wherein communication is held by finely controlling the transmission power of each mobile access terminal, the characteristics degradation of the radio access point incurs increase in the transmission power of the mobile access terminal and leads to the lowering of serviceability as shortens a communicable time period. It is accordingly important for the stable operation of the system and the enhancement of serviceability to monitor, not only the propriety of communication, but also the radio characteristics degradation. In view of these points, means is eagerly requested for testing radio characteristics on-line without interrupting the offered communication service.

SUMMARY OF THE INVENTION

In view of the above circumstances, the present invention has for its object to realize a radio access point testing method and apparatus which permit the normality verification and radio characteristics test of a radio communication system even during the operation of the system. Another object of the invention is to provide a radio access point testing method and apparatus which can comprehensively test various failures. Still another object of the invention is to execute a test without interrupting an offered communication service. A further object of the invention is to provide a method and an apparatus which can execute a test in a desired access point and sector on-line.

In order to accomplish the objects, with note taken of the "3GPP2 (C. S0032)" standard by way of example, the invention has configured a system which includes a radio communication apparatus and a radio communication network, and it has provided a testing method which can execute the normality verification and radio characteristics test of the system on-line. Concretely, a test function unit which has the communication function of a radio access terminal (including a mobile access terminal function) is arranged in a radio access point apparatus, and a main signal processing unit and the test function unit are connected using directional couplers which are respectively connected to antenna connection parts, so as to be couplable in desired directions. With note taken of the fact that an access point controls access terminal transmission power finely in a communication system of CDMA format, an antenna failure is detected from the difference between access-terminal transmission power values at the changeover of the coupling directions of test signals. Besides, the test function unit is endowed with a function capable of separating a forward link signal and a reverse link signal and setting attenuation values individually, and communication qualities are respectively estimated while the attenuation values are being changed, thereby to detect the transmitter failure and receiver failure of the main signal function unit. It is permitted to detect the failures of the radio access point without interrupting a communication service, by executing the series of tests on-line.

According to the first resolution means of the invention, there is provided a radio access point testing apparatus, comprising:

an access terminal function portion which has a communication function of a communication access terminal in a radio communication system, and which operates for testing a radio access point;

radio analog portions of respective sectors, each of which is connected with the access terminal function portion and with an antenna of one loop or antennas of two loops for transmitting a signal to and receiving a signal from the communication access terminal by radio;

each of the radio analog portions including:

a radio reception part of one loop or radio reception parts of two loops which receives/receive forward link signals transmitted from the access terminal function portion and the communication access terminal;

a radio transmission part which transmits reverse link signals that are transmitted to the access terminal function portion and the communication access terminal;

a first switch which changes-over paths of the signals that are transmitted to and received from the access terminal function portion, between paths passing through the antenna and paths not passing through the antenna; and a directional coupler which connects the antenna, the first switch, the radio transmission part and/or the radio reception part to one another;

a signal processing portion which modulates and demodulates the signals;

a second switch which connects the access terminal function portion, the radio analog portion of a desired one of the sectors and/or a desired one of the loops;

a test function controller which changes-over the second switch in accordance with identification information of the sector and/or loop to-be-tested, and which changes-over the first switch at a predetermined timing in a case where test sort information indicates an antenna failure test; and an access point controller which receives a test start instruction containing the test sort information, and which controls in accordance with the test sort information, at least one of (1) the antenna failure test in which a voltage surface wave ratio is evaluated on the basis of transmission power values of the access terminal function portion before and after the changeover of the first switch, (2) a receiver failure test in which a packet error rate is adjusted into a predetermined range, and a reception sensitivity is evaluated on the basis of the transmission power of the access terminal function portion after the adjustment, and (3) a transmitter failure test in which transmission power from the radio analog portion is evaluated on the basis of a reception power value of the access terminal function portion.

According to the second resolution means of the invention, there is provided a radio access point testing method which employs an access terminal function portion for testing an access point; radio analog portions of respective sectors, each including a first switch for changing-over paths of signals that are transmitted to and received from the access terminal function portion, between paths passing through an antenna and paths not passing through the antenna, and each being connected with the access terminal function portion; a second switch for connecting the access terminal function portion with a desired one of the radio analog portions; a test function controller for changing-over the first switch and the second switch; and an access point controller for controlling at least one test; comprising the steps of:

allowing the access point controller to receive a test start instruction which contains test sort information, and identification information of the sector and/or a loop to-be-tested;

allowing the access point controller to transmit to the test function controller a switch changeover instruction which contains the sector identification information and/or loop identification information;

allowing the test function controller to receive the switch changeover instruction, and to change-over the second switch so that the sector and/or loop corresponding to the identification information may be connected with the access terminal function portion, in accordance with the identification information of the sector and/or loop to-be-tested; and allowing the access point controller to control in accordance with the test sort information, at least one of (1) an antenna failure test in which a voltage surface wave ratio is evaluated on the basis of transmission power values of the access terminal function portion before and after the changeover of the first switch, (2) a receiver failure test in which a packet error rate is adjusted into a predetermined range, and a reception sensitivity is evaluated on the basis of transmission power of the access terminal function portion after the adjustment, and (3) a transmitter failure test in which transmission power from the radio analog portion is evaluated on the basis of a reception power value of the access terminal function portion.

DETAILED DESCRIPTION OF THE PREFERRED EMBODIMENTS

Now, the configurations of a radio communication apparatus and a radio communication network according to the present invention, and methods of operating them will be described in detail with reference to the drawings by taking a "1xEV-DO (1x Evolution Data Only)" system as an example.

Figure 1:
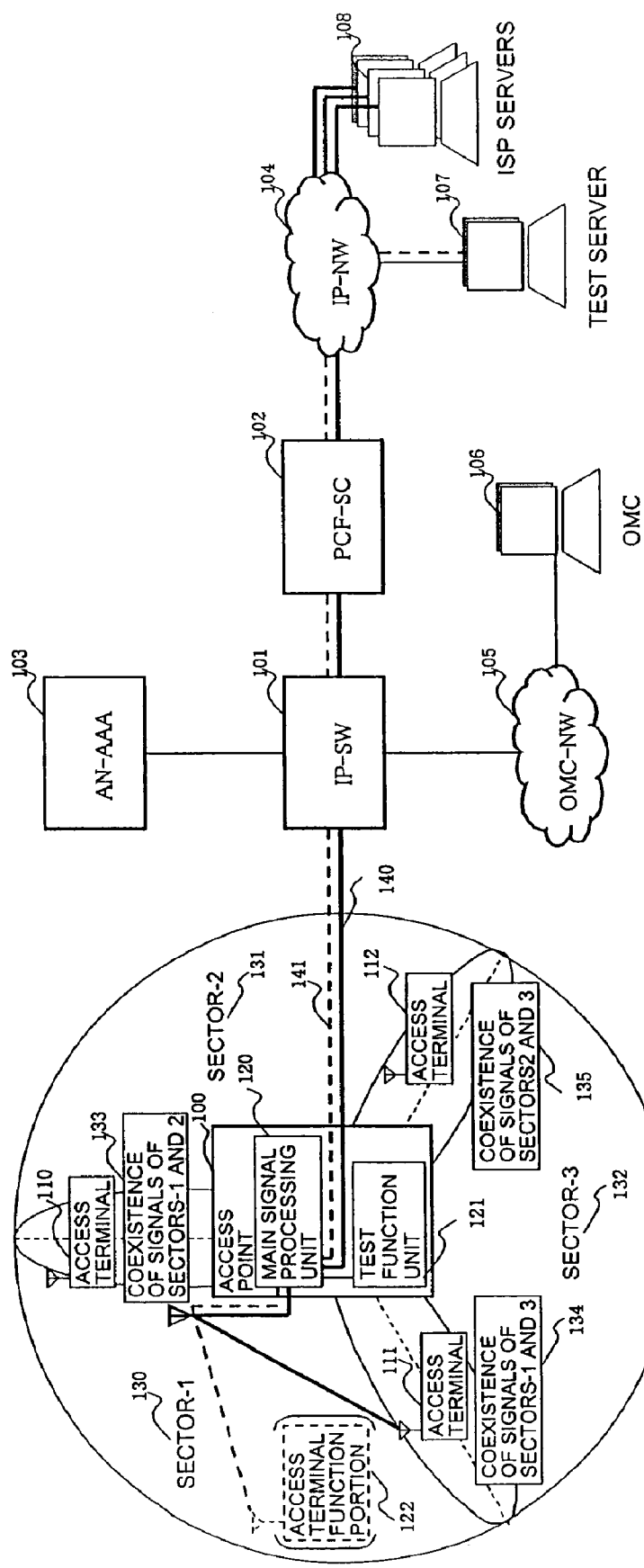
FIG. 1 is a system configurational diagram of a radio access point testing system in a "1xEV-DO" system.

FIG. 1 is a configurational diagram of a radio access point testing system in a "1xEV-DO" system. The radio access point testing system includes an access point (radio access point testing apparatus) 100, an IP-SW (IP switch) 101, a PCF-SC (Packet Control Function-Session Control, radio packet control apparatus) 102, an AN-AAA (Access Network-Authentication, Authorization, and Accounting) 103, an OMC (Operation and Maintenance Center, maintenance apparatus) 106, a test server 107, and ISP (Internet Service Provider) servers 108.

The access point 100 has a main signal processing unit 120, and a test function unit 121 including an access terminal function portion 122. This access point 100 communicates with, for example, access terminals 110, 111 and 112 by using a main signal path 140. A circle which surrounds the access point 100, visualizes the outline of an area in which radio waves are transmitted from the access point 100. Besides, the IP-SW 101 is connected to the access point 100, etc., and it performs the switching of packets, etc.

The PCF-SC 102 being the radio packet control apparatus has such functions as the management of session information, the authentication of access terminals, and the control and termination of radio packets. The AN-AAA 103 is a server for authenticating access terminals, and it has such functions as the registration and management of user information. The OMC 106 is a maintenance terminal equipment, and it has the functions of monitoring and controlling the access point 100 and the PCF-SC 102. This OMC 106 is communicable with the access point 100 through, for example, an OMC-NW (OMC network) and the IP-SW 101.

The test server 107 is a server for tests. By way of example, the access terminal function portion 122 can be connected to an IP-NW (IP network) 104 by a calling connection process, so as to communicate with the test server 107 in executing a test. Each of the ISP servers 108 executes, for example, a user authentication process.

The main signal processing unit 120 is mounted in the access point 100, and it is capable of processing the signals of at most three sectors, for example, sector-1 (130), sector-2 (131) and sector-3 (132). Which of the sectors the access point 100 uses in the communication of this access point 100 with the access terminal, depends upon the states of radio waves which the access terminals are receiving. Usually, however, places 133, 134 and 135 where the access terminals receive the radio waves of the plurality of sectors are existent as shown in the figure. Besides, in some cases, the access terminals move out of the sectors, or the power sources thereof are turned OFF. It is accordingly very difficult to discriminate if the respective sectors are normally functioning, from operating states.

In this embodiment, in order to solve such a problem, the test function unit 121 is mounted in the access point 100, and further, the access terminal function portion 122 is built in the test function unit 121. Thus, the access terminal function portion 122 and the access point 100 are permitted to communicate in states simulating all environments, by using an access-point testing signal path 141. The example of FIG. 1 illustrates that the access terminal function portion 122 located in the access point 100 communicates with this access point 100 as if it were existent in the sector-1. When the communication has undergone any failure here, it can be discriminated that the sector-1 is faulty. That is, it is permitted to reliably verify the normality of the sector.

Incidentally, since this embodiment utilizes an interface in the case of performing ordinary calling connection, it can specify a failing part without employing any special apparatus for transmitting signaling.

Figure 2:
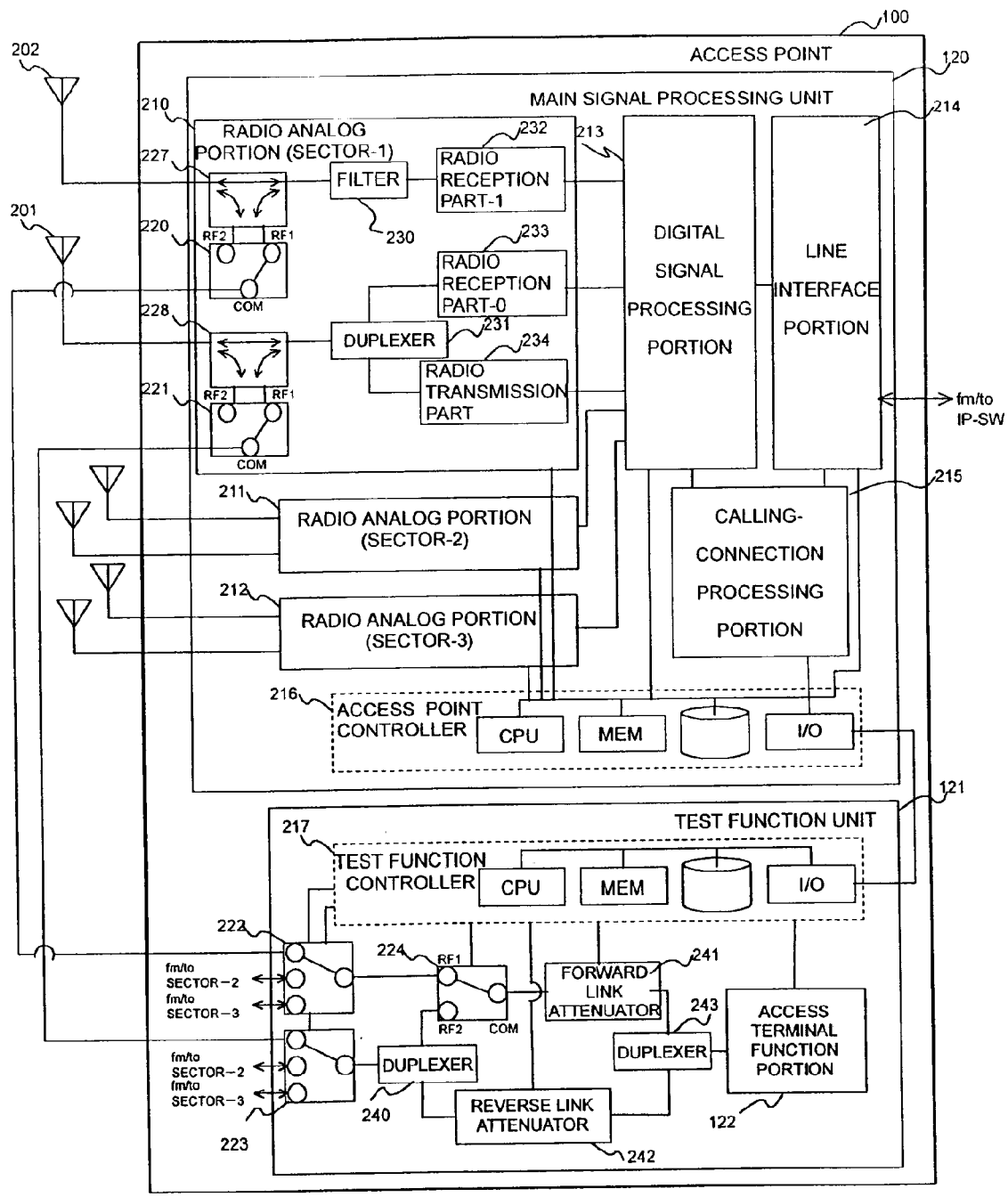
FIG. 2 is a block diagram showing the configuration of an access point 100.

FIG. 2 is a block diagram showing a configurational example of the access point 100.

The access point 100 includes, for example, the main signal processing unit 120 which has antennas 201 and 202, radio analog portions 210-212 corresponding to the sectors, a digital signal processing portion 213, a line interface 214, a calling-connection processing portion 215 and an access point controller 216, and the test function unit 121 which has a test function controller 217, the access terminal function portion 122 and RF-SWs (radio-frequency coaxial switches) 222-224. Besides, the test function unit 121 may well further include, for example, duplexers 240 and 243, a forward link attenuator 241, and a reverse link attenuator 242.

The radio analog portion (sector-1) 210 is a unit which has the function of processing a radio signal, and it has, for example, directional couplers 227 and 228, RF-SWs 220 and 221, a filter 230, a duplexer 231, radio reception parts 232 and 233, and a radio transmission part 234. Incidentally, the access point 100 can be constructed as a diversity configuration. As shown in FIG. 2 by way of example, the diversity configuration can have the antenna 201 and radio reception part-0 (233) of loop-0, and the antenna 202 and radio reception part-1 (232) of loop-1. Alternatively, it is also allowed to employ a system in which an antenna and a radio reception part are of single loop.

The loop-0 antenna 201 is a forward-link signal reception antenna. Besides, the loop-1 antenna 202 is a forward-link signal reception and reverse-link signal transmission antenna.

The directional coupler 227 connects, for example, the antenna 202, RF-SW 220, and radio reception part-1 (232) to one another. Likewise, the directional coupler 228 connects, for example, the antenna 201, RF-SW 221, and radio transmission part 234 and/or radio reception part-0 (233) to one another.

The RF-SWs (first switches) 220 and 221 are switches which change-over the paths of radio signals. Byway of example, the RF-SWs 220 and 221 change-over whether the paths of signals to be transmitted to and received from the access terminal function portion 122 are paths which pass through the antennas, or paths which do not pass through the antennas.

The filter 230 is a filter which stops unnecessary signals in signals received by the antenna 202. Although the loop-0 antenna 201 simultaneously performs forward-link signal reception and reverse-link signal transmission, the duplexer 231 has the function of separating a forward-link signal and a reverse-link signal so that only the forward-link signal may be inputted to the radio reception part-0. Incidentally, the forward-link signal reception and the reverse-link signal transmission can be separately performed, but another antenna needs to be added, and the configuration shown in FIG. 2 is desirable from the aspect of, for example, cost. Besides, the duplexer 231 has the filter function of stopping unnecessary signals so that unnecessary signals may not be transmitted from the radio transmission part 234.

The radio reception parts 232 and 233 convert forward link signals transmitted from the access terminals (general mobile access terminals and access terminal function portion 122), from analog signals into digital signals, and they send the digital signals to the digital signal processing portion 213. The radio transmission part 234 converts a reverse link signal sent from the digital signal processing portion 213, from a digital signal into an analog signal, and it transmits the analog signal to the access terminal.

Each of the radio analog portion 211 of the sector-2 and the radio analog portion 212 of the sector-3 is the same as the above radio analog portion 210 of the sector-1, and shall be omitted from description.

The digital signal processing portion 213 is a unit which demodulates the forward link signal and modulates the reverse link signal. The line interface portion 214 is an interface for connecting the calling-connection processing portion 215 and the access point controller 216 with the external IP-SW 101. The calling-connection processing portion 215 is connected with the individual radio analog portions through the digital signal processing portion 213, and it chiefly executes calling connection processes.

The access point controller 216 controls the whole access point. Besides, the access point controller 216 receives a test start instruction containing test sort information, from the OMC 106, and it controls the execution of a test complying with the test sort information. Such tests can cover, for example, the following tests:

(1) Antenna failure test in which a voltage surface wave ratio is evaluated on the basis of the transmission power of the access terminal function portion 122, so as to detect any antenna failure including the failure of the antenna 201 or 202.

(2) Receiver failure test in which a packet error rate is adjusted into a predetermined range, and a reception sensitivity is evaluated on the basis of the transmission power of the access terminal function portion 122 on that occasion, so as to detect any receiver failure including the failure of the radio reception part 232 or 233.

(3) Transmitter failure test in which the transmission power values of the radio analog portions 210-212 are evaluated on the basis of the reception power value of the access terminal function portion 122, so as to detect any transmitter failure including the failure of the radio transmission part 234.

By the way, the details of the respective tests will be explained later.

The test function controller 217 operates, for example, to change-over the RF-SWs 222-224 in accordance with the identification information of the sector and/or loop to-be-tested as is designated by the OMC 106, and to change-over the RF-SWs 220 and 221 at a predetermined timing in a case where the test sort information designated by the OMC 106 indicates the antenna failure test.

The access terminal function portion 122 is a testing access terminal which is mounted in the access point 100. This access terminal function portion 122 has the same functions (for example, a communication function) as those of the ordinary radio mobile access terminal (radio access terminal) which communicates through the antennas. By way of example, the access terminal function portion 122 communicates with the radio analog portion 210 through paths 250 and 260 shown in FIG. 2 as will be referred to later. The calling-connection processing portion 215 of the main signal processing unit 120 executes call processing in the same way as in the ordinary access terminal, and it establishes the call of, for example, the test server 107 with the access terminal function portion 122.

The RF-SWs (second switches) 222 and 223 are switches which selectively change-over the radio analog portions 210-212 of the respective sectors that are to be connected with the access terminal function portion 122. Besides, the RF-SW 224 changes-over the loop in each sector, to the loop-0 or the loop-1. Incidentally, the access point 100 usually subjects each access terminal to a power control so as to transmit the minimum power required for keeping calling connection, to the access terminal. Also the access terminal function portion 122 in this embodiment is similarly subjected to the power control. The duplexer 243 has the same functions as those of the above duplexer 231.

The forward link attenuator 241 is an attenuator which attenuates the power of a forward link signal. Besides, the reverse link attenuator 242 is an attenuator which attenuates the power of a reverse link signal. By way of example, the test function controller 217 adjusts the power attenuation values of the forward link attenuator 241 and reverse link attenuator 242, thereby to simulate the environment of the access terminal function portion 122 into a desired radio-wave environment. By way of example, the test function controller 217 receives a data rate from the OMC 106 and regulates the attenuation value of the attenuator so that a difference obtained by subtracting the attenuation value from the transmission power of the access point 100 may fall within the range of power corresponding to the received data rate, on the basis of the relationship between prescribed data rates and reception power values. Incidentally, the relationship between the data rates and the reception power values is prescribed by the "3GPP2" standard, and these data items can be stored in, for example, the memory of the test function controller 217 beforehand.

(Antenna Failure Detecting Test)

Figure 3:
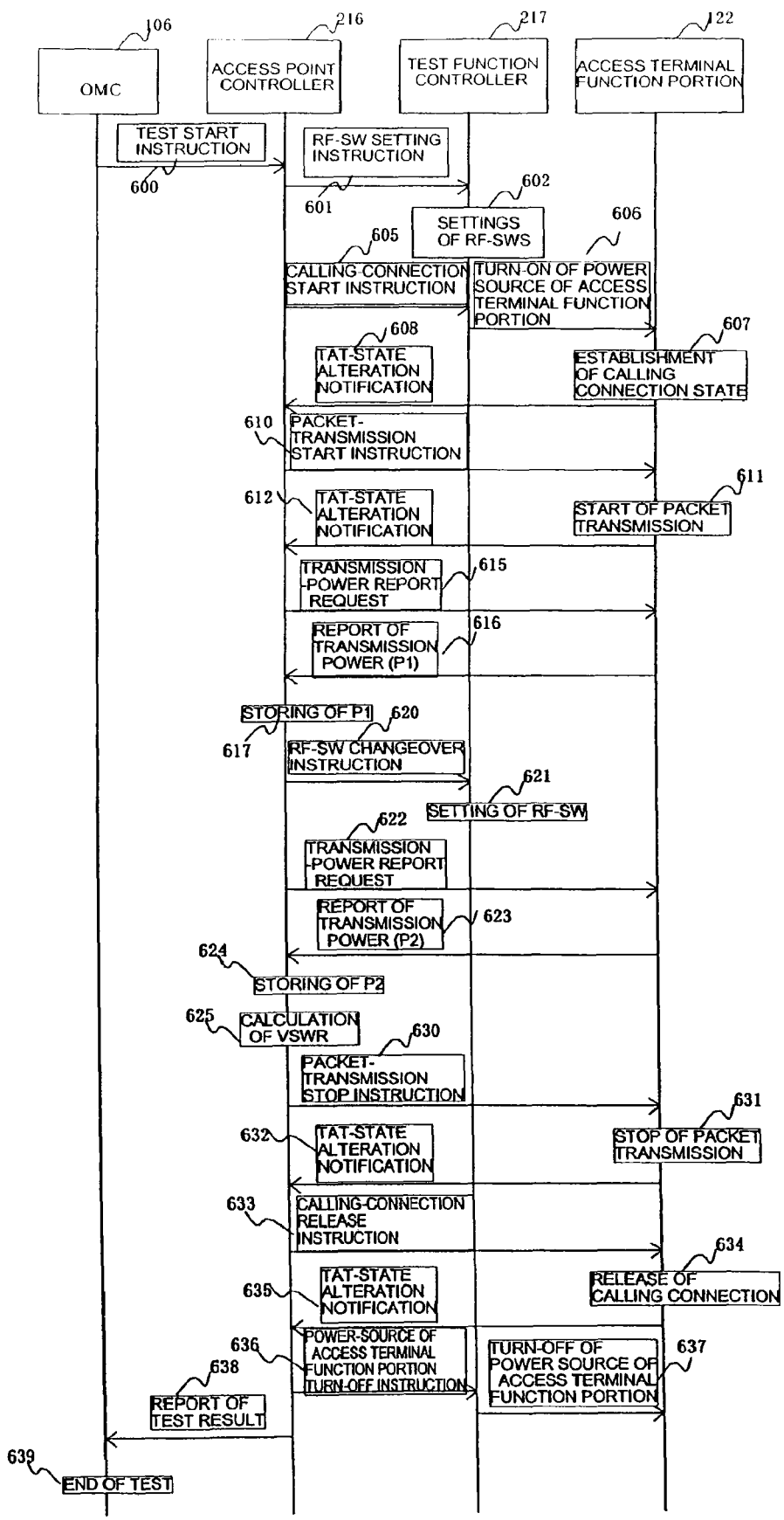
FIG. 3 is an explanatory diagram of a sequence in the case of detecting an antenna failure.
Figure 4:
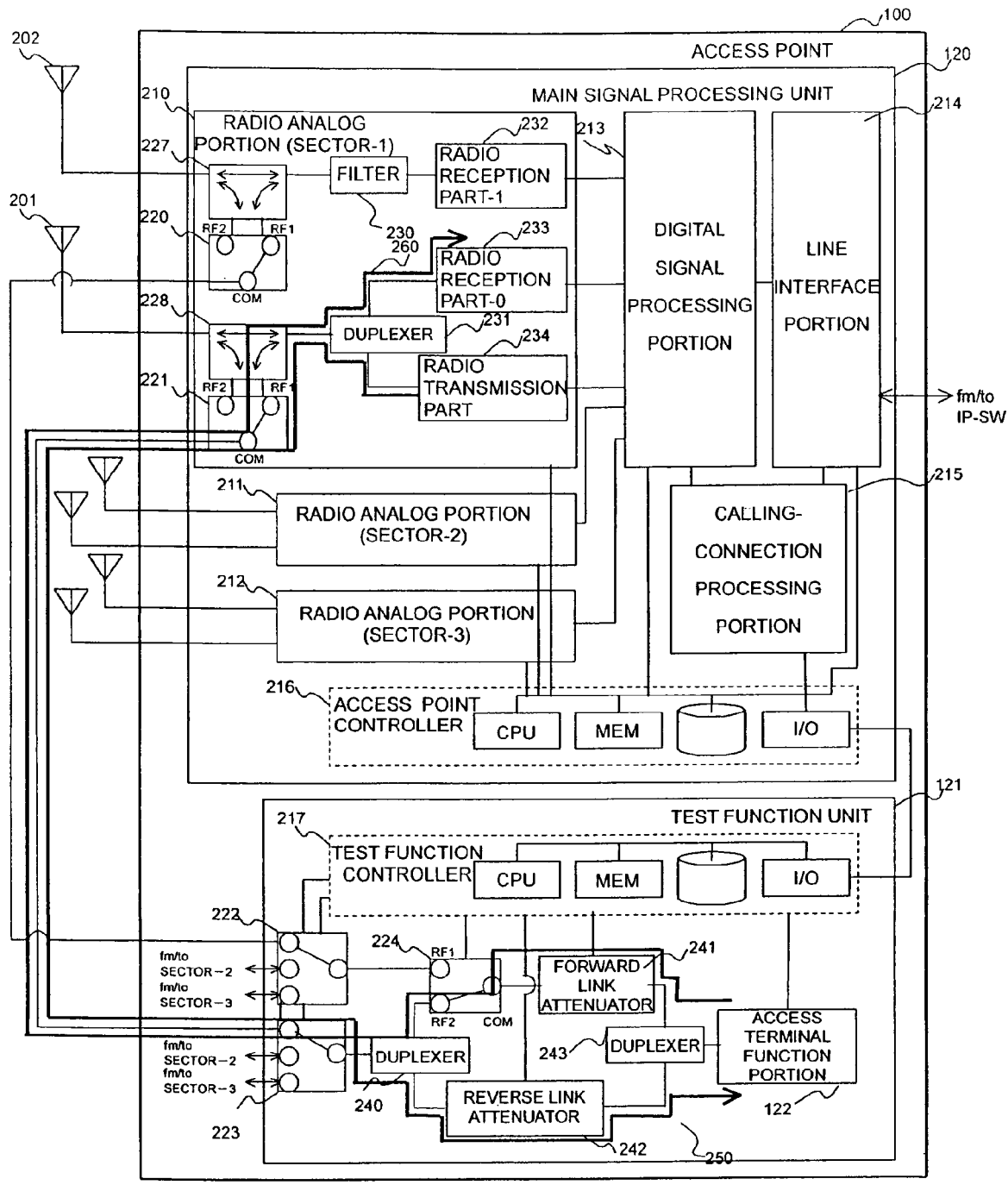
FIG. 4 is an explanatory diagram (1) of the paths of radio signals in the case of detecting an antenna failure as to the loop-0 antenna of a sector-1.
Figure 5:
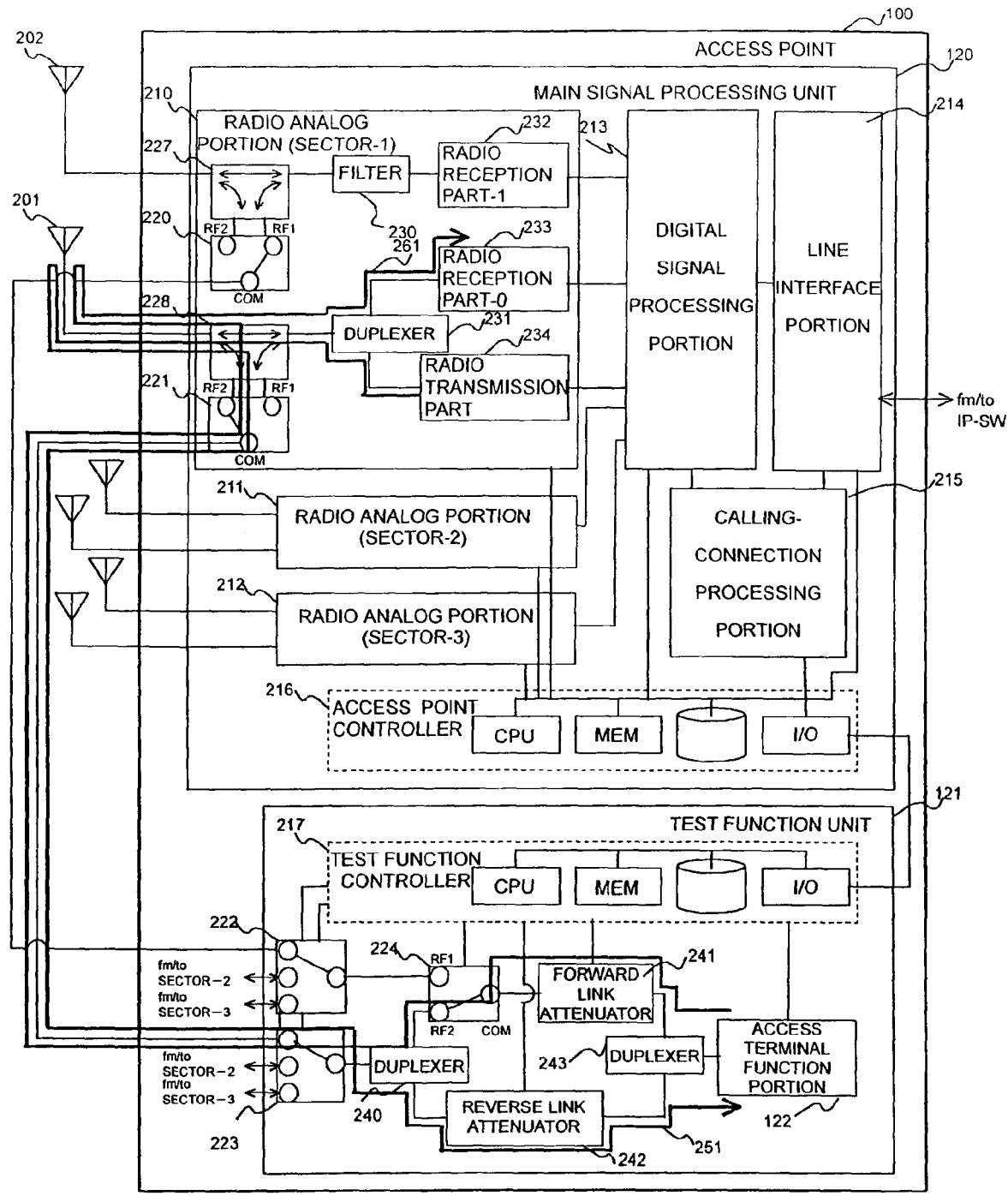
FIG. 5 is an explanatory diagram (2) of the paths of radio signals in the case of detecting an antenna failure as to the loop-0 antenna of the sector-1.

FIG. 3 is an explanatory diagram of a sequence in the case of detecting any antenna failure. Besides, FIGS. 4 and 5 are explanatory diagrams (1) and (2) of the paths of radio signals in the case of detecting an antenna failure as to the loop-0 antenna 201 of the sector-1, respectively. Now, the operation of the antenna failure test will be described with reference to FIGS. 3, 4 and 5. By the way, in FIG. 3 and the ensuing description, signals Ack replying to requests shall be omitted because they are ordinarily existent.

The test is started, for example, in such a way that the instruction of executing the antenna failure test (VSWR test) is inputted from a maintenance operator to the OMC 106. The instruction of executing the VSWR test contains, for example, the designation of an access point to-be-tested, and the designation of an antenna to-be-tested (in which a sector and a loop, for example, are designated).

At a step 600, the OMC 106 notifies a test start instruction which contains a test sort (here, the VSWR failure test) and the identification information of the designated antenna (for example, the identification information items of the sector and the loop), to the access point controller 216 of the designated access point 100. Incidentally, it is also allowed to omit the designation of the antenna to-be-tested and to successively execute tests for all antennas or predetermined antennas included in the access point 100.

At a step 601, the access point controller 216 having received the test start instruction whose test sort indicates the VSWR test instructs the test function controller 217 to set the RF-SWs 220-224 (RF-SW setting instruction). Incidentally, the maintenance operator can designate the antenna (sector and loop) to-be-tested, and the access point controller 216 instructs the test function controller 217 to set the RF-SWs in correspondence with the designated antenna. By way of example, information items which indicate how to set the respective RF-SWs in correspondence with the identification information items of the sectors and loops, as to the individual antennas, are stored in the memory of the access point controller 216, or the like beforehand, and the access point controller 216 can give the instruction of the settings of the respective RF-SWs corresponding to the designated antenna, with reference to the memory or the like.

Subsequently, at a step 602, the test function controller 217 sets the RF-SWs 220-224 in compliance with the RF-SW setting instruction. In a case, for example, where the loop-0 antenna 201 of the sector-1 is to be tested, the RF-SWs 224, 223 and 221 are set as shown in FIG. 4. Owing to such settings of the RF-SWs, packets of forward-link direction from the access terminal function portion 122 are permitted to be received through the path 260 in the figure, while packets of reverse-link direction are permitted to be transmitted through the path 250 in the figure. Besides, the test function controller 217 sets the RF-SW 221 as shown in FIG. 4. Owing to such a setting, the path 260 of signals which are transmitted to and received from the access terminal function portion 122 are prevented from passing through the antenna 201.

At a step 605, the access point controller 216 instructs the test function controller 217 to set the access terminal function portion 122 and to start calling connection (calling-connection start instruction). At a step 606, the test function controller 217 having accepted the calling-connection start instruction turns ON the power source of the access terminal function portion 122.

At a step 607, the access terminal function portion 122 whose power source has been turned ON dials up, for example, the test server 107 and establishes a calling connection state in accordance with a predetermined setting. Incidentally, connection destination information items such as the dial number of the test server 107 are stored in the memory within the access terminal function portion 122 beforehand. On this occasion, the access terminal function portion 122 communicates with the radio analog portion 210 through the paths 250 and 260. The calling-connection processing portion 215 of the main signal processing unit 120 executes call processing in the same way as in the case of the ordinary access terminal, and it establishes the call between the access terminal function portion 122 and the test server 107. Incidentally, the access point 100 usually subjects each access terminal to the power control so as to transmit the minimum power required for keeping calling connection, to the access terminal. Also the access terminal function portion 122 in this embodiment is similarly subjected to the power control.

At a step 608, the access terminal function portion 122 notifies the access point controller 216 that the call has been connected. In this embodiment, the notification of the state alteration by the access terminal function portion 122 as in, for example, this sequence is expressed as "TAT (Test Access Terminal)-State alteration notification". The "TAT-State alteration notification" contains information which indicates, for example, the state of the access terminal function portion 122 or the change of the state. Incidentally, the access terminal function portion 122 and the access point controller 216 are capable of transmitting and receiving data therebetween through, for example, the test function controller 217.

Subsequently, at a step 610, the access point controller 216 instructs the access terminal function portion 122 to start packet transmission (packet-transmission start instruction). At a step 611, the access terminal function portion 122 having accepted the packet-transmission start instruction executes, for example, ping and starts the packet transmission to the test server 107. Incidentally, an appropriate command or application for transmitting Packets can be executed other than the ping. The packets transmitted from the access terminal function portion 122 are transmitted to the test server 107 through the path 260, radio reception part-0 (233), line interface 214, etc. shown in FIG. 4. By the way, the access terminal function portion 122 continues the packet transmission until a packet-transmission stop instruction is received. At a step 612, the access terminal function portion 122 sends the access point controller 216 "TAT-State alteration notification" which contains information indicating the start of the packet transmission.

Subsequently, at a step 615, the access point controller 216 requests the access terminal function portion 122 to report the transmission power of this access terminal function portion 122 (transmission-power report request). At a step 616, the access terminal function portion 122 reports its transmission power to the access point controller 216 in response to the transmission-power report request. By way of example, the access terminal function portion 122 reports the average value of transmission power values for a predetermined time period before or after the acceptance of the transmission-power report request. Alternatively, the access terminal function portion 122 may well report the instantaneous value of the transmission power at the acceptance of the transmission-power report request. At a step 617, the access point controller 216 stores the reported transmission power value P1 in the memory.

Subsequently, at a step 620, the access point controller 216 instructs the test function controller 217 to change-over the RF-SW 220 or 221. In the example shown in FIG. 4, the access point controller 216 gives the instruction of changing-over the RF-SW 221 which corresponds to the antenna to-be-tested in the radio analog portion. At a step 621, the test function controller 217 sets the RF-SW 220 or 221 in compliance with the instruction at the step 620. By way of example, the test function controller 217 changes-over the RF-SW 221 so that, as shown in FIG. 5, packets to be transmitted to and received from the access terminal function portion 122 may pass through the antenna. When the RF-SW 221 has been changed-over, the packets of forward-link direction from the access terminal function portion 122 are permitted to be received through a path 261 including the antenna 201 in FIG. 5, while the packets of reverse-link direction are permitted to be transmitted through a path 251 in the figure.

The access terminal function portion 122 is subjected to the power control likewise to the ordinary access terminal. In this regard, the transmission power of the access terminal function portion 122 increases in correspondence with the transmission coefficient of the antenna, owing to the changeover of the RF-SW 221 as stated above. The VSWR (voltage surface wave ratio) of the antenna is computed from the difference of the transmission power values, and the detection of the antenna failure is permitted. Incidentally, the line is sometimes disconnected for a moment during the changeover of the RF-SW 221, but the moment is a slight time period, and hence, the call is not disconnected due to the line disconnection.

At a step 622, the access point controller 216 requests the access terminal function portion 122 to report the transmission power of this access terminal function portion 122 (transmission-power report request). At a step 623, the access terminal function portion 122 reports its transmission power after the RF-SW changeover, to the access point controller 216 in response to the transmission-power report request 622. At a step 624, the access point controller 216 stores the reported transmission power value P2 in the memory.

At a step 625, the access point controller 216 reads out of the memory the transmission power values P1 and P2 which have been stored at the respective steps 617 and 624, and it calculates the VSWR in conformity with the following equation:

$$VSWR=(P2+P1)/(P2-P1)$$

Here, P1: the transmission power value of the access terminal function portion in the case where the paths of the signals which are transmitted to and received from this access terminal function portion do not pass through the antenna, and P2: the transmission power value of the access terminal function portion in the case where the paths of the signals which are transmitted to and received from this access terminal function portion pass through the antenna.

Besides, the access point controller 216 stores the calculated VSWR in the memory. Incidentally, the access point controller 216 can also judge whether or not the antenna failure has occurred, depending upon the VSWR, for example, upon whether or not it is larger than a predetermined threshold value, or upon whether it falls within or out of a predetermined range. The result of the judgment may be stored in the memory.

Here, in a case where another antenna is to be further tested, the sequence can be returned to the step 601 so as to execute the processes of the steps 601-625. Incidentally, at the step 601, by way of example, the access point controller 216 can designate the antenna (sector and loop) for the next test, in a predetermined order, whereupon it instructs the test function controller 217 to set the RF-SWs.

On the other hand, at a step 630, the access point controller 216 instructs the access terminal function portion 122 to stop the packet transmission (packet-transmission stop instruction). At a step 631, the access terminal function portion 122 stops the packet transmission in compliance with the packet-transmission stop instruction. At a step 632, the access terminal function portion 122 sends the access point controller 216 "TAT-State alteration notification" which contains information indicating the stop of the packet transmission.

Subsequently, at a step 633, the access point controller 216 instructs the access terminal function portion 122 to release the calling connection. At a step 634, the access terminal function portion 122 releases the calling connection in compliance with the calling-connection release instruction. Further, at a step 635, the access terminal function portion 122 sends the access point controller 216 "TAT-State alteration notification" which contains information indicating the release of the calling connection.

At a step 636, the access point controller 216 instructs the test function controller 217 to turn OFF the power source of the access terminal function portion 122 (power-source turn-OFF instruction). At a step 637, the test function controller 217 having accepted the power-source turn-OFF instruction turns OFF the power source of the access terminal function portion 122.

At a step 638, the access point controller 216 reports a test result to the OMC 106. The test result can contain, for example, information for identifying the tested antenna (for example, sector and loop), the value of the VSWR stored in the memory, and/or information indicating whether or not the antenna failure has occurred. At a step 639, the OMC 106 receives the test result, displays the received test result on a display unit, and/or stores it in a storage unit, whereupon the test is ended.

Although the test of the loop-0 antenna 201 of the sector-1 has been described above byway of example, a VSWR test can be executed in the same way as in the foregoing, as to another antenna (for example, the loop-1 antenna of the sector-1, or the antenna of another sector). That is, merely the settings of the RF-SWs 220-224 differ depending upon the antenna to-be-tested, and the operation is the same as in the sequence diagram shown in FIG. 3.

Figure 6:
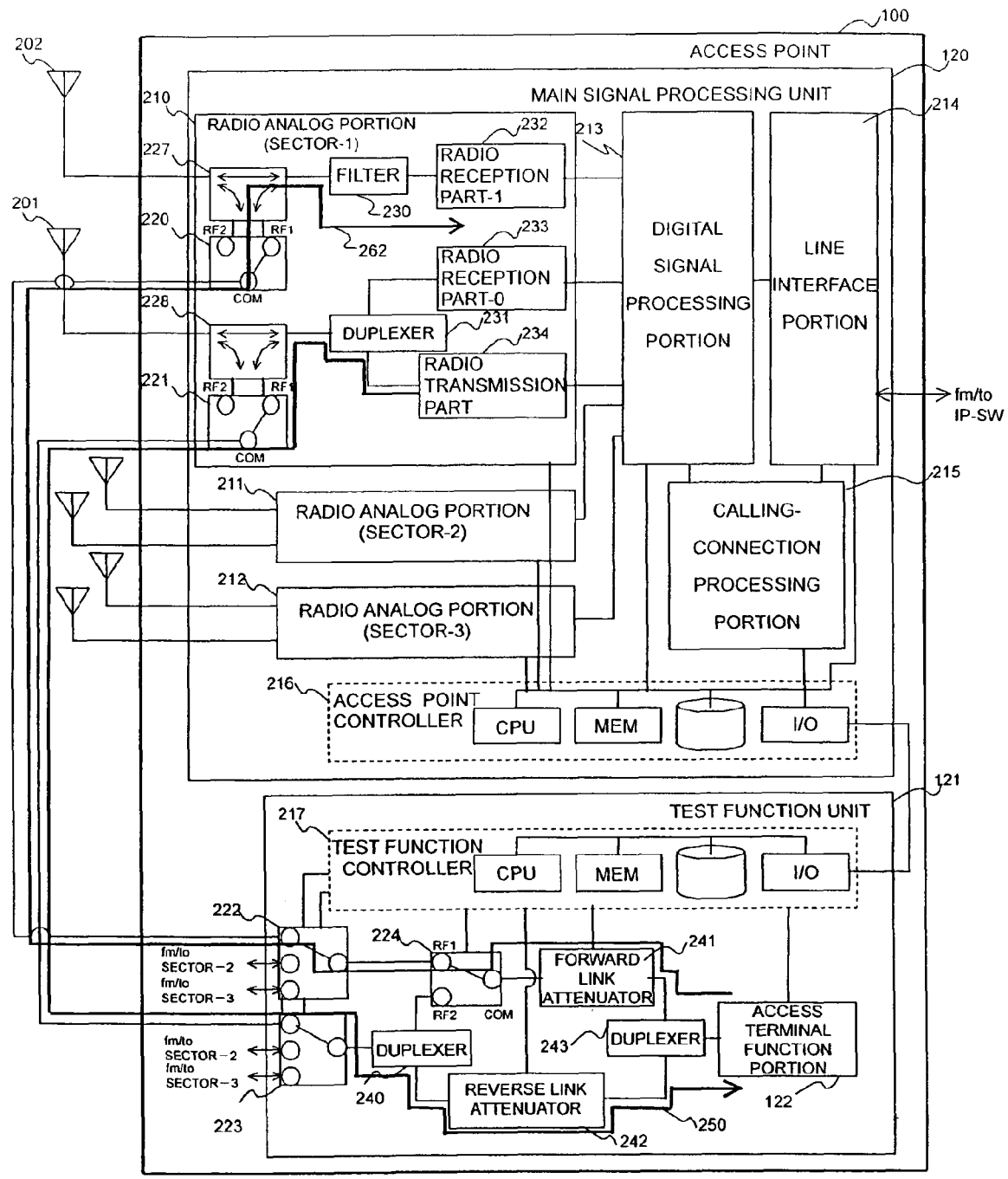
FIG. 6 is an explanatory diagram (1) of the paths of radio signals in the case of detecting an antenna failure as to the loop-1 antenna of the sector-1.
Figure 7:
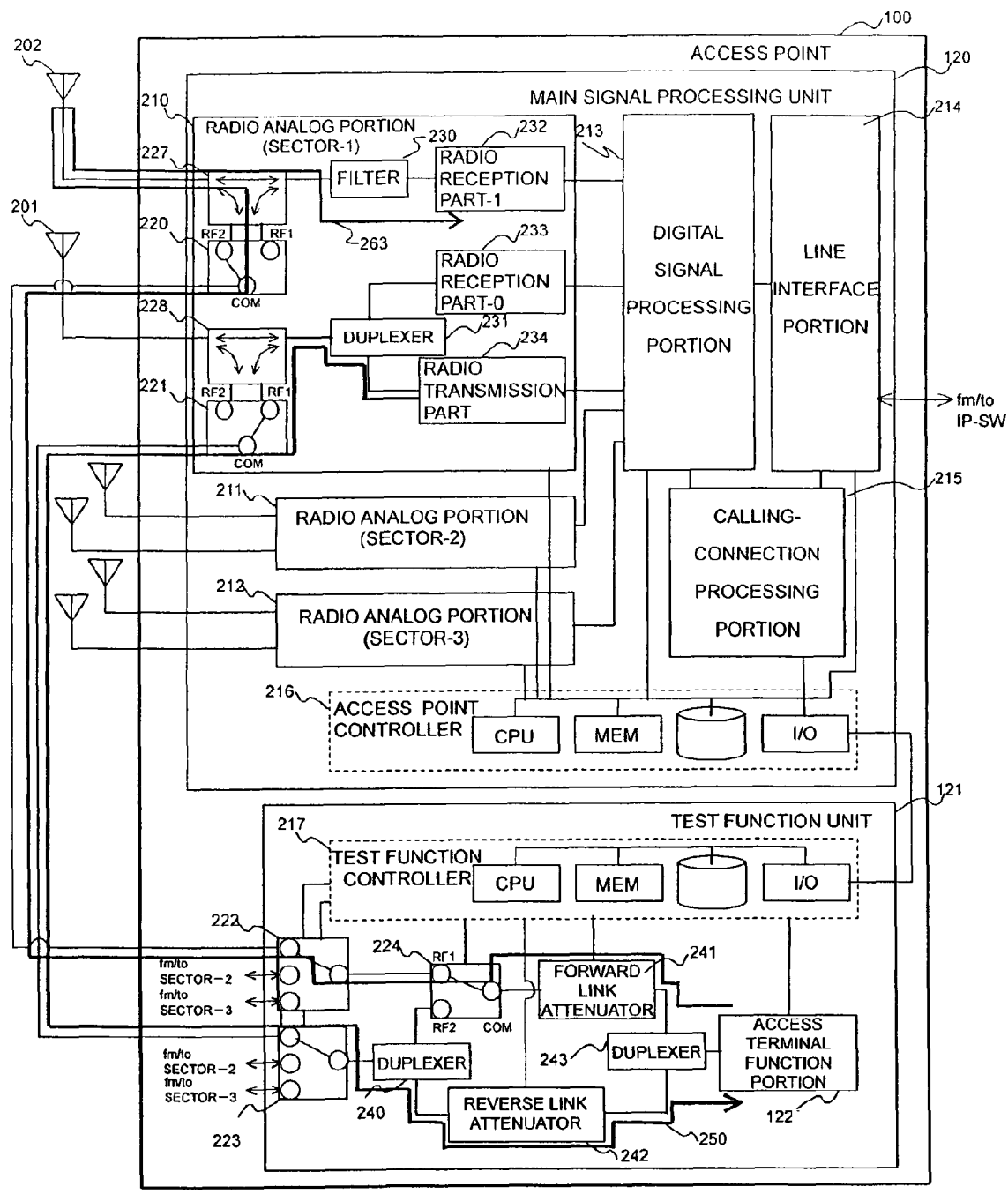
FIG. 7 is an explanatory diagram (2) of the paths of radio signals in the case of detecting an antenna failure as to the loop-1 antenna of the sector-1.

FIGS. 6 and 7 are explanatory diagrams (1) and (2) of the paths of radio signals in the case of detecting an antenna failure as to the loop-1 antenna 202 of the sector-1, respectively. Here, the test of the loop-1 antenna 202 of the sector-1 will be described in conjunction with the sequence diagram shown in FIG. 3, with reference to FIGS. 6 and 7.

First, the test is started in such a way that the instruction of executing the VSWR test (antenna failure test) is inputted from a maintenance operator to the OMC 106. Here, the instruction of executing the VSWR test contains, for example, the designation of an access point to-be-tested, and the designation of an antenna to-be-tested (here, the loop-1 antenna 202 of the sector-1). At a step 600, as in the above description, the OMC 106 notifies a test start instruction which contains a test sort (here, the VSWR failure test) and the identification information of the designated antenna (here, the loop-1 of the sector-1), to the access point controller 216 of the designated access point 100.

At a step 601, the access point controller 216 instructs the test function controller 217 to set the RF-SWs 220-224 corresponding to the loop-1 antenna 202 of the sector-1. At a step 602, the test function controller 217 sets the RF-SWs 220-224 as shown in FIG. 6, in compliance with the RF-SW setting instruction corresponding to the loop-1 antenna 202 of the sector-1. The RF-SW 224, for example, is set so that packets of forward-link direction may be sent to the radio reception part-1 232 corresponding to the loop-1 antenna 202. Since steps 605-620 are the same as in the foregoing, they shall be omitted from description.

Besides, at a step 621, the test function controller 217 changes-over the RF-SW 220 corresponding to the loop-1 antenna 202 of the sector-1, in order that a path 263 in the forward-link direction may pass through the antenna 202 as shown in FIG. 7. Since steps 622, et seq. are the same as in the foregoing, they shall be omitted from description.

In this manner, the RF-SWs are changed-over in correspondence with the antenna to-be-tested, whereby any antenna in the access point 100 can be tested. Incidentally, the settings of the RF-SWs as correspond to antennas can be stored in, for example, the memory of the access point controller 216 or the test function controller 217 beforehand.

(Receiver Failure Detecting Test)

Figure 8:
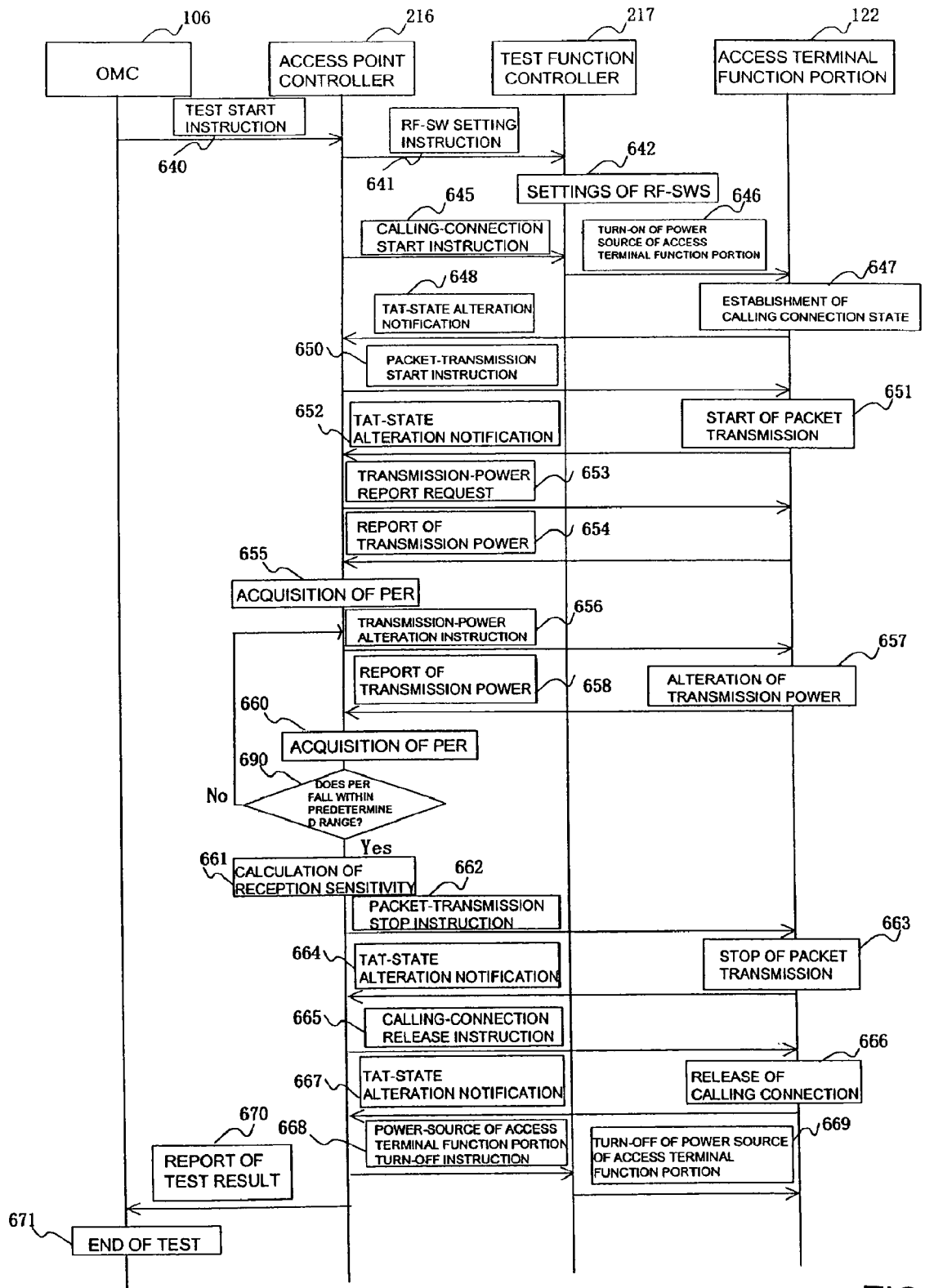
FIG. 8 is an explanatory diagram of a sequence in the case of executing a receiver failure detecting test.
Figure 9:
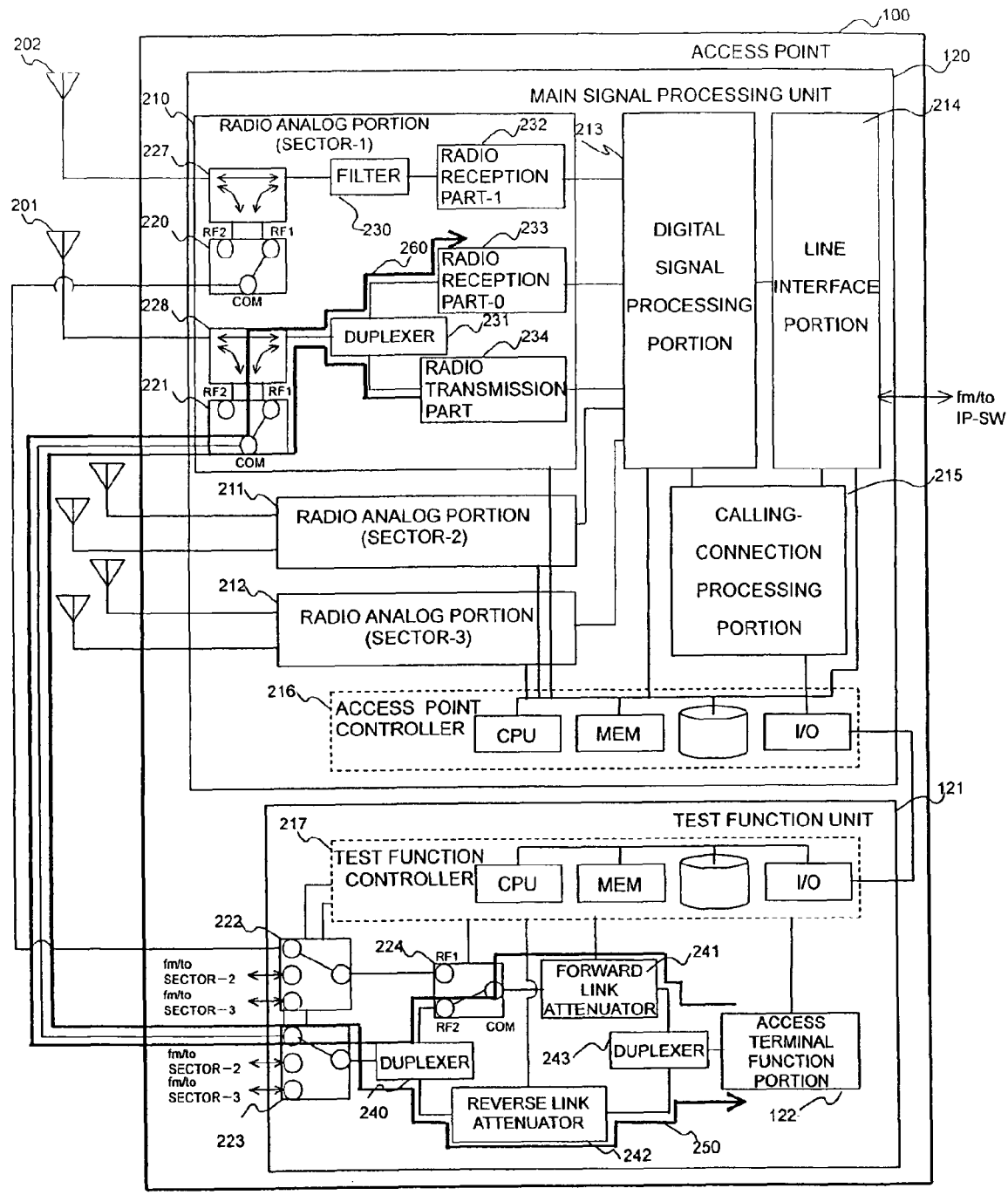
FIG. 9 is an explanatory diagram of signal paths in the case of executing a receiver failure detecting test as to the radio reception part-0 of the sector-1.
Figure 10:
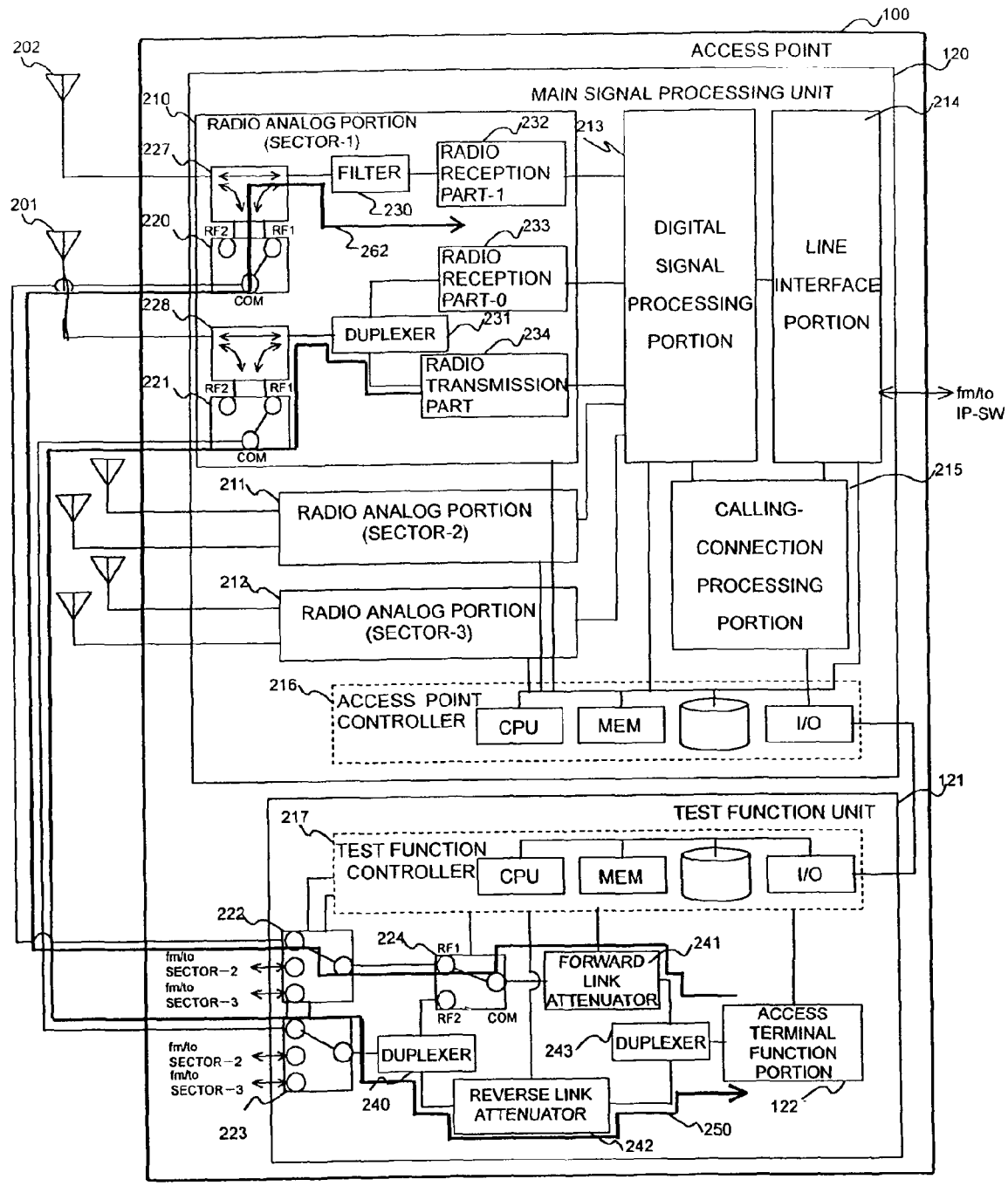
FIG. 10 is an explanatory diagram of signal paths in the case of executing a receiver failure detecting test as to the radio reception part-1 of the sector-1.

FIG. 8 is an explanatory diagram of a sequence in the case of executing a receiver failure detecting test. Besides, FIGS. 9 and 10 are explanatory diagrams (1) and (2) of signal paths in the case of executing the receiver failure detecting test as to the radio reception parts-0 and 1 of the sector-1, respectively. Now, the operation of the receiver failure detecting test will be described with reference to FIGS. 8, 9 and 10. By the way, in FIG. 8 and the ensuing description, signals Ack replying to requests shall be omitted because they are ordinarily existent.

The test is started, for example, in such a way that the instruction of executing receiver failure detection (a reception sensitivity test) is inputted from a maintenance operator to the OMC 106. The instruction of executing the receiver failure detection contains, for example, the designation of a sector and a loop to-be-tested.

At a step 640, the OMC 106 notifies a test start instruction which contains a test sort (here, the receiver failure detection) and the identification information items of the designated sector and loop, to the access point controller 216 of the designated access point 100. Incidentally, it is also allowed to omit the designation of the sector and loop to-be-tested and to successively execute tests for all sectors and loops, or predetermined sectors and loops included in the access point 100.

At a step 641, the access point controller 216 having received the test start instruction whose test sort indicates the receiver failure detection instructs the test function controller 217 to set the RF-SWs 220-224 (RF-SW setting instruction). Incidentally, the maintenance operator can designate the sector and loop (loop-0 or loop-1) of the receiver to-be-tested, and the access point controller 216 instructs the test function controller 217 to set the RF-SWs in correspondence with the designated receiver. By way of example, information items which indicate how to set the respective RF-SWs in correspondence with the identification information items of the sectors and loops, as to the individual receivers, are stored in the memory of the access point controller 216 beforehand, and the access point controller 216 can give the instruction of the settings of the respective RF-SWs corresponding to the designated receiver, with reference to the memory.

At a step 642, the test function controller 217 sets the RF-SWs 220-224 in compliance with the RF-SW setting instruction. In a case, for example, where the loop-0 of the sector-1 is to be tested, the RF-SWs 224, 223 and 221 are set as shown in FIG. 9. Besides, the test function controller 217 sets the RF-SW 221 so that signal paths may pass through neither of the antennas 201 and 202 as shown in FIG. 9. Owing to such settings of the RF-SWs, packets of forward-link direction from the access terminal function portion 122 are permitted to be received through the path 260 in the figure, while packets of reverse-link direction are permitted to be transmitted through the path 250 in the figure.

At a step 645, the access point controller 216 instructs the test function controller 217 to set the access terminal function portion 122 and to start calling connection (calling-connection start instruction). At a step 646, the test function controller 217 having accepted the calling-connection start instruction turns ON the power source of the access terminal function portion 122. At a step 647, the access terminal function portion 122 whose power source has been turned ON dials up, for example, the test server 107 and establishes a calling connection state in accordance with a predetermined setting. Incidentally, connection destination information items such as the dial number of the test server 107 are stored in the memory within the access terminal function portion 122 beforehand.

At a step 648, the access terminal function portion 122 sends the access point controller 216 "TAT-State alteration notification" which contains information indicating the connection of calling. Incidentally, the access terminal function portion 122 and the access point controller 216 are capable of transmitting and receiving data therebetween through, for example, the test function controller 217.

At a step 650, the access point controller 216 instructs the access terminal function portion 122 to start packet transmission (packet-transmission start instruction). At a step 651, the access terminal function portion 122 having accepted the packet-transmission start instruction executes, for example, ping and starts the packet transmission to the test server 107. Incidentally, an appropriate command or application for transmitting packets can be executed other than the ping. The packets transmitted from the access terminal function portion 122 are transmitted to the test server 107 through the path 260, radio reception part-0 (233), line interface 214, etc. By the way, the access terminal function portion 122 continues the packet transmission until a packet-transmission stop instruction is received. At a step 652, the access terminal function portion 122 sends the access point controller 216 "TAT-State alteration notification" which contains information indicating the start of the packet transmission.

Subsequently, at a step 653, the access point controller 216 requests the access terminal function portion 122 to report the transmission power of this access terminal function portion 122 (transmission-power report request). At a step 654, the access terminal function portion 122 reports its transmission power to the access point controller 216 in response to the transmission-power report request. By way of example, the access terminal function portion 122 reports the average value of transmission power values for a predetermined time period before or after the acceptance of the transmission-power report request. Alternatively, the access terminal function portion 122 may well report the instantaneous value of the transmission power at the acceptance of the transmission-power report request. The access point controller 216 stores the reported transmission power value P1 in the memory.

At a step 655, the access point controller 216 acquires a PER (packet error rate). The PER can be measured as stated below by way of example. The digital signal processing portion 213 illustrated in FIG. 2, etc. has the function of making a request for re-transmitting packets which cannot be demodulated due to errors, in demodulating a forward link signal which is transmitted from the access terminal function portion 122. It is accordingly possible to count the number of the packets for which the re-transmission request was made on account of the errors (hereinbelow, called the "number of error packets"), and the number of packets which were normally received, among the packets of the forward link signal as were received by the digital signal processing portion 213. The digital signal processing portion 213 counts the number of error packets and the number of normally received packets in advance, and it calculates the PER in conformity with the following equation: PER [%]=(Number of error packets)/(Total number of received packets) Incidentally, the "total number of received packets" signifies the total of the number of error packets and the number of normally received packets.

By way of example, the access point controller 216 requests the digital signal processing portion 213 to report the value of the PER, whereby it can acquire the PER transmitted in response to the request by the digital signal processing portion 213. Incidentally, the access point controller 216 may well acquire the number of error packets and the number of normally received packets (or the total number of received packets) from the digital signal processing portion 213 so as to calculate the PER in conformity with the above formula. Besides, the access point controller 216 stores the acquired PER in the memory.

At a step 656, the access point controller 216 instructs the access terminal function portion 122 to alter the transmission power in accordance with the PER (transmission-power alteration instruction). By way of example, in a case where the measured PER is lower than a prescribed threshold value, the instruction of lowering the transmission power is given, and conversely, in a case where the PER is higher than the prescribed threshold value, the instruction of raising the transmission power is given.

At a step 657, the access terminal function portion 122 alters the transmission power in compliance with the instruction from the access point controller 216. Subsequently, at a step 658, the access terminal function portion 122 reports the altered transmission power to the access point controller 216. At a step 660, the access point controller 216 acquires a PER again and stores the acquired PER in the memory. The measurement of the PER is the same as in the foregoing.

At a step 690, the access point controller 216 judges if the PER falls within the prescribed range of threshold values. In a case where the PER falls within the prescribed range of threshold values, the access point controller 216 shifts to the process of a step 661. On the other hand, in a case where the measured PER does not fall within the prescribed range of threshold values, the access point controller 216 returns to the step 656, it iterates the processes of the steps 656-660 and 690, and it adjusts the transmission power of the access terminal function portion 122 so that the PER may fall within the prescribed range of threshold values.

At the step 661, the access point controller 216 calculates a reception sensitivity from the reported value of the transmission power of the access terminal function portion 122, and the value of the loss of the signal path 260 or a signal path 262 extending from the access terminal function portion 122 to the radio reception part-0 (233) or radio reception part-1 (232). By way of example, the access point controller 216 reads out the reported transmission power value of the access terminal function portion 122 and the path loss value with reference to the memory of the test function controller 217, and it calculates the reception sensitivity in conformity with the following equation:

Reception sensitivity=(Transmission power value of Access terminal function portion)−(Path loss value)

That transmission power of the access terminal function portion 122 which is employed here is the transmission power as to which the PER has fallen within the prescribed range of threshold values by iterating the processes of the above steps 653-660, and it has been stored in the memory at, for example, the step 660. Besides, the value of the path loss can be fixed to a value which is capable of attenuating the transmission power of the access terminal function portion 122 down to a reception sensitivity point. That is, the path loss value is a value which was fixedly set at the design of the apparatus. Since, however, a manufactural dispersion is involved in the path loss value, the value of the loss can be measured at the manufacture of the apparatus so as to store the measured value in the memory of the test function controller 217. Here, the "reception sensitivity point" indicates that power value of the reception power of the access point 100 below which the reception becomes impossible.

Besides, the access point controller 216 stores the calculated reception sensitivity in the memory. Also, the access point controller 216 can judge whether or not the receiver failure has occurred, on the basis of the reception sensitivity, for example, depending upon whether or not it is larger than a predetermined threshold value, or upon whether it falls within or out of a predetermined range. The result of the judgment may be stored in the memory.

At a step 662, the access point controller 216 instructs the access terminal function portion 122 to stop the packet transmission (packet-transmission stop instruction). At a step 663, the access terminal function portion 122 stops the packet transmission in compliance with the packet-transmission stop instruction. At a step 664, the access terminal function portion 122 sends the access point controller 216 "TAT-State alteration notification" which contains information indicating the stop of the packet transmission.

Subsequently, at a step 665, the access point controller 216 instructs the access terminal function portion 122 to release the calling connection (calling-connection release instruction). At a step 666, the access terminal function portion 122 releases the calling connection in compliance with the calling-connection release instruction. Further, at a step 667, the access terminal function portion 122 sends the access point controller 216 "TAT-State alteration notification" which contains information indicating the release of the calling connection.

At a step 668, the access point controller 216 instructs the test function controller 217 to turn OFF the power source of the access terminal function portion 122 (power-source turn-OFF instruction). At a step 669, the test function controller 217 having accepted the power-source turn-OFF instruction turns OFF the power source of the access terminal function portion 122.

At a step 670, the access point controller 216 reports a test result to the OMC 106. The test result can contain, for example, information for identifying the tested receiver (for example, sector and loop), the reception sensitivity stored in the memory, and/or information indicating whether or not the receiver failure has occurred. At a step 671, the OMC 106 receives the test result, displays the received test result on a display unit, and/or stores it in a storage unit, whereupon the test is ended.

Although the loop-0 of the sector-1 has been referred to above, a receiver failure test can be similarly executed as to the other loop or the other sector. That is, merely the settings of the RF-SWs 220-224 differ depending upon the antenna to-be-tested, and the operation is the same as in the sequence diagram shown in FIG. 8. In a case, for example, where the loop-1 of the sector-1 is to be tested, the RF-SWs (221-224) are set as shown in FIG. 10.

(Transmitter Failure Detecting Test)

Figure 11:
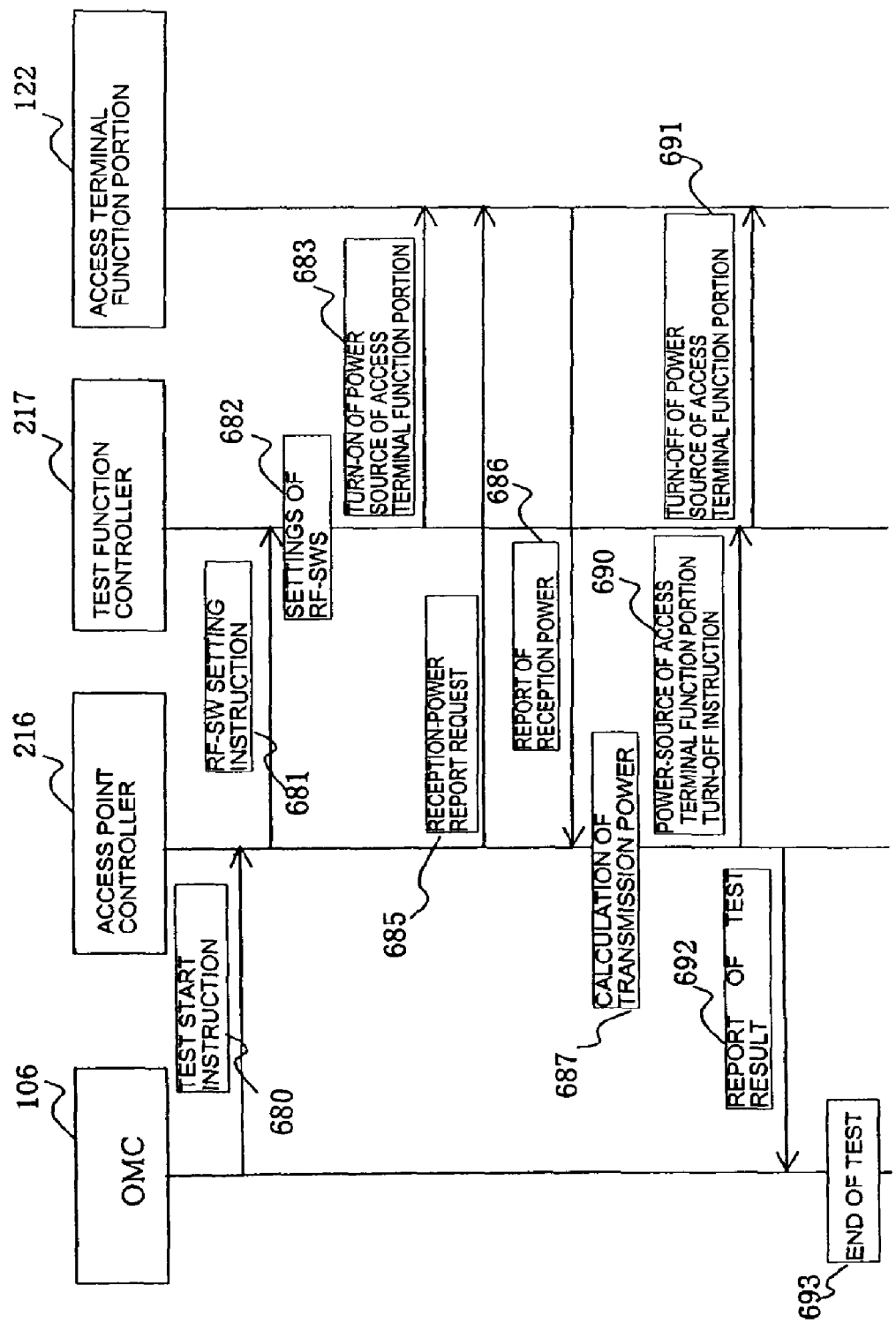
FIG. 11 is an explanatory diagram of a sequence in the case of executing a transmitter failure detecting test.
Figure 12:
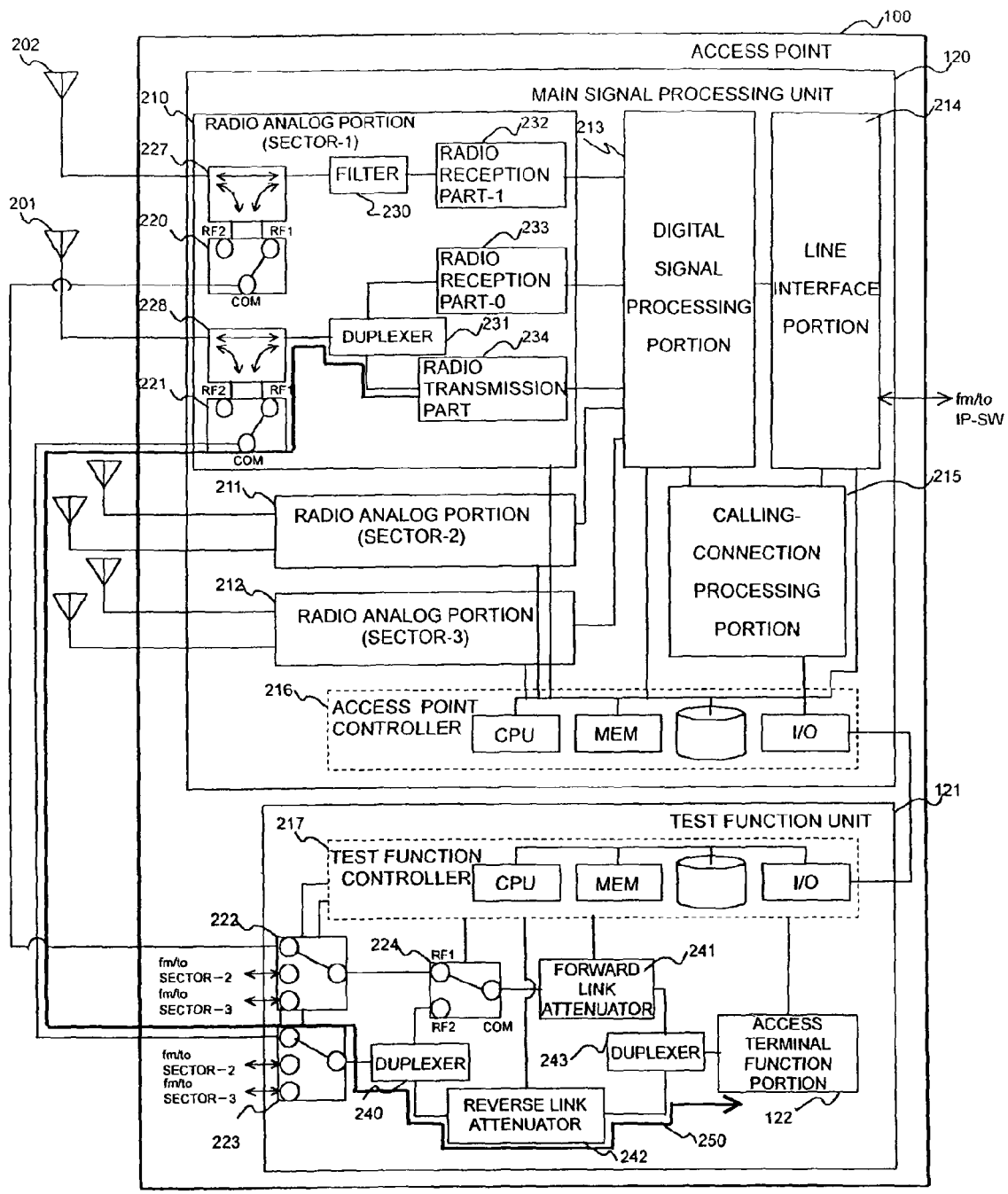
FIG. 12 is an explanatory diagram of a signal path in the case of executing a transmitter failure detecting test as to the radio transmission part of the sector-1.
Figure 13:
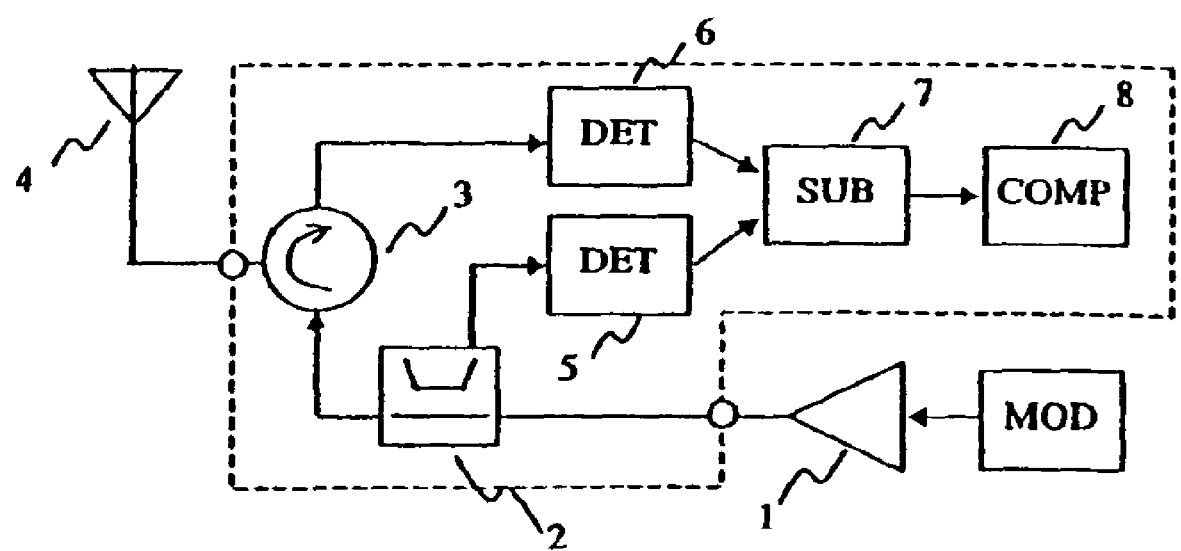
FIG. 13 is an explanatory diagram of a prior-art example of an antenna failure detector.
Figure 14:
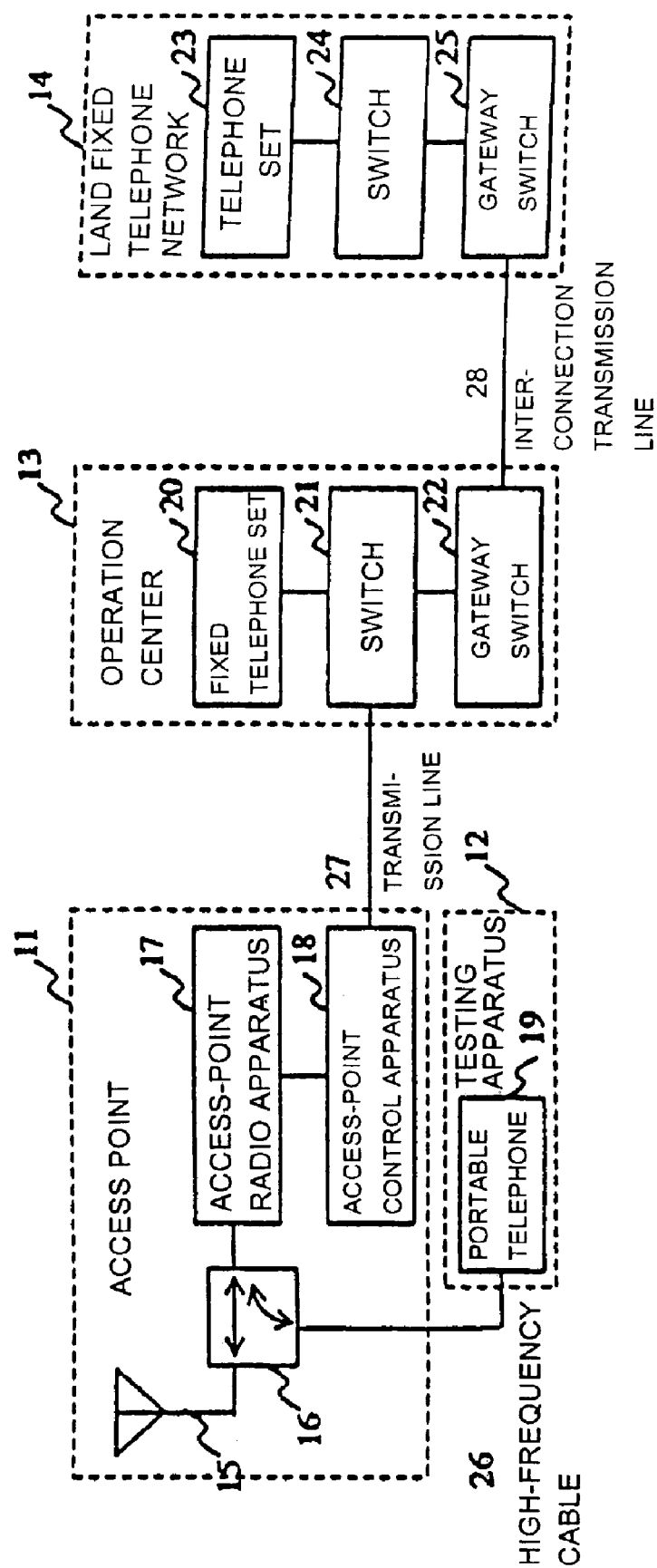
FIG. 14 is an explanatory diagram of a prior-art example of a testing apparatus.

FIG. 11 is an explanatory diagram of a sequence in the case of executing a transmitter failure detecting test. Besides, FIG. 12 is an explanatory diagram of a signal path in the case of executing the transmitter failure detecting test as to the radio transmission part 234 of the sector-1. Now, the operation of the transmitter failure detecting test will be described with reference to FIGS. 11 and 12. By the way, in FIG. 11 and the ensuing description, signals Ack replying to requests shall be omitted because they are ordinarily existent.

The test is started, for example, in such a way that the instruction of executing transmitter failure detection (a transmission power test) is inputted from a maintenance operator to the OMC 106. The instruction of executing the transmitter failure detection contains, for example, the designation of an access point to-be-tested and the designation of a sector to-be-tested.

At a step 680, the OMC 106 notifies a test start instruction which contains a test sort (here, the transmitter failure detection) and the identification information of the designated sector, to the access point controller 216 of the designated access point 100. Incidentally, it is also allowed to omit the designation of the sector to-be-tested and to successively execute tests for all sectors or predetermined sectors included in the access point 100.

At a step 681, the access point controller 216 having received the test start instruction whose test sort indicates the transmitter failure detection instructs the test function controller 217 to set the RF-SWs 220-224 (RF-SW setting instruction). Incidentally, the maintenance operator can designate the sector of the transmitter to-be-tested, and the access point controller 216 instructs the test function controller 217 to set the RF-SWs in correspondence with the designated transmitter. By way of example, information items which indicate how to set the respective RF-SWs in correspondence with the identification information items of the sectors, as to the individual transmitters, are stored in the memory of the access point controller 216 beforehand, and the access point controller 216 can give the instruction of the settings of the respective RF-SWs corresponding to the designated transmitter, with reference to the memory. By the way, the correspondence information items can be created in a format which is common to that of the information items for use in the antenna failure test or the receiver failure detecting test described before.

At a step 682, the test function controller 217 sets the RF-SWs 220-224 in compliance with the RF-SW setting instruction. In a case, for example, where the sector-1 is to be tested, the RF-SWs 221 and 223 are set as shown in FIG. 12. Owing to such settings of the RF-SWs, packets of reverse-link direction are permitted to be transmitted and received through the path 250 in the figure. Subsequently, at a step 683, the test function controller 217 turns ON the power source of the access terminal function portion 122.

Besides, at a step 685, the access point controller 216 requests the access terminal function portion 122 to report the reception power of this access terminal function portion 122 (reception-power report request). At a step 686, the access terminal function portion 122 reports its reception power to the access point controller 216 in response to the reception-power report request. Byway of example, the access terminal function portion 122 reports the average value of reception power values for a predetermined time period before or after the acceptance of the reception-power report request. Alternatively, the access terminal function portion 122 may well report the instantaneous value of the reception power at the acceptance of the reception-power report request. The access point controller 216 stores the reported reception power value in the memory.

At a step 687, the access point controller 216 reads out of the memory the value of the reception power of the access terminal function portion 122, and the value of the path loss of the signal path 250 extending between the radio transmission part 234 and the access terminal function portion 122, and it calculates the transmission power value of the radio transmission part 234 in conformity with the following equation:

Transmission power value of Access point=(Reception power value of Access terminal function portion)+(Path loss value)

Here, the value of the path loss is the same as in the foregoing case of the receiver failure detection. Besides, the access point controller 216 stores the calculated transmission power value in the memory. Also, the access point-controller 216 can judge whether or not the transmitter failure has occurred, on the basis of the calculated transmission power value, for example, depending upon whether or not it is larger than a predetermined threshold value, or upon whether it falls within or out of a predetermined range. The result of the judgment may be stored in the memory.

At a step 690, the access point controller 216 instructs the test function controller 217 to turn OFF the power source of the access terminal function portion 122 (power-source turn-OFF instruction). At a step 691, the test function controller 217 having accepted the power-source turn-OFF instruction turns OFF the power source of the access terminal function portion 122.

At a step 692, the access point controller 216 reports a test result to the OMC 106. The test result can contain, for example, information for identifying the tested transmitter (for example, sector and identification information), the transmission power value stored in the memory, and/or information indicating whether or not the transmitter failure has occurred. At a step 693, the OMC 106 receives the test result, displays the received test result on a display unit, and/or stores it in a storage unit, whereupon the test is ended.

Incidentally, regarding the other sectors, the RF-SWs 222-224 are appropriately changed-over, and transmitter failure tests can be executed similarly to the above.

According to the present invention, it is possible to realize a radio access point testing method and apparatus which permit the normality verification and radio characteristics test of a radio communication system even during the operation of the system. Besides, according to the invention, it is possible to provide a radio access point testing method and apparatus which can comprehensively test various failures. According to the invention, it is possible to execute a test without interrupting an offered communication service. Further, according to the invention, it is possible to provide a method and an apparatus which can execute a test in a desired access point and sector on-line.

What is claimed is:

1. An access point having a plurality of sectors and performing radio communication with a radio access terminal in one of the sectors, the access point comprising:
   a main signal processing unit including:
   a plurality of antennas for each sector;
   radio transmission parts for said each sector connected with one of the antennas and for transmitting radio signals to the radio access terminal through a connected antenna; and
   radio reception parts for said each sector connected with one of the antennas and for receiving radio signals from the radio access terminal through the connected antenna,
   an access point controller; and
   a test function unit including:
   an access terminal function portion which has a communication function same as or similar to a communication function of the radio access terminal;

a first switch for selecting the sector, which is an object of a test designated from among a plurality of tests and performed using the test function unit, from among the plurality of sectors;

a second switch for selecting the antenna, which is the object of the test performed using the test function unit, from among the plurality of antennas of the sector which is the object of the test and is selected by the first switch; and a test function controller, wherein the main signal processing unit further includes, for each sector:

a third switch for connecting the antenna, the radio transmission part and the test function unit through a directional coupler and for selecting one of a path for transmitting packets from the radio transmission part to the test function unit passing through the directional coupler and the antenna and, a path for transmitting packets from the radio transmission part to the test function unit passing through the directional coupler and not passing through the antenna;

a fourth switch for connecting the antenna, the radio reception part and the test function unit through a directional coupler and for selecting one of a path for transmitting packets from the test function unit to the radio reception part passing through the directional coupler and the antenna and, a path for transmitting packets from the test function unit to the radio reception part passing through the directional coupler and not passing through the antenna.

2. An access point according to claim 1, wherein the access point receives an instruction of executing the test from a maintenance apparatus through a network, wherein the access point controller instructs the test function controller to set the first and second switches to select one antenna of the sector which is the object of the test, based on an antenna identification information which specifies the sector and the antenna of the object of the test and is included in the instruction of executing the test, wherein the access point controller instructs the test function controller to set the third and fourth switches to select, for the antenna selected by the first and second switches, one of (a) the antenna side and (b) the radio reception part side or the radio transmission part side based on a test identification information included in the instruction of executing the test, and wherein the access point performs the test designated by the maintenance apparatus for the designated antenna of the designated sector.

3. An access point according to claim 2, wherein when the test identification information included in the instruction of executing the test designates an antenna failure test, the test function controller, in accordance with a control by the access point controller, performs the following:

sets the third and fourth switches to be connected with the radio transmission part and the radio reception part which are connected with selected antenna at a first timing after selecting one antenna of the sector which is the object of the test by the first and second switches;

controls to report, to the access point controller, a first transmission power value which is obtained by establishing a calling connection between the access terminal function portion and an apparatus of a connection destination stored in advance and transmitting a packet by the access terminal function portion;

changes over, at a second timing, the third and fourth switches to be connected with the selected antenna from the radio reception part and the radio transmission part which correspond to the selected antenna, controls to report, to the access point controller, a second transmission power value which is obtained by transmitting a packet to the apparatus of the connection destination stored in advance by the access terminal function portion;

calculates a voltage surface wave ratio of the selected antenna based on the first and the second transmission power value to perform the antenna failure test.

4. An access point according to claim 2, wherein when the test identification information included in the instruction of executing the test designates a receiver failure test, the test function controller, in accordance with a control by the access point controller, performs the following:

sets the third and fourth switches to be connected with the radio transmission part and the radio reception part which are connected with selected antenna after selecting one antenna of the sector which is the object of the test by the first and second switches, wherein the access terminal function portion establishes a calling connection to an apparatus for a connection destination stored in advance and transmits a packet, and wherein the access point controller calculates a packet error rate of a packet received by the radio reception part and, based on the packet error rate, sets a transmission power value by performing transmission power control of the access terminal function portion;

calculates a reception sensitivity of the radio reception part based on the transmission power value and a path loss value of a path where a signal transmitted from the radio transmission part returns the radio reception part via the test function unit to perform the receiver failure test for the selected antenna.

5. An access point according to claim 2, wherein when the test identification information included in the instruction of executing the test designates a transmitter failure test:

wherein the test function controller, in accordance with a control by the access point controller, sets, after selecting one antenna of the sector which is the object of the test by the first and second switches, the third switch to be connected with the radio transmission part which is connected with selected antenna to set a path through which a transmission signal is transmitted from the radio transmission part which is connected with the selected antenna to the test function unit, and wherein the access point controller calculates a transmission power value of the access point based on a reception power value of the access terminal function portion and a path loss value of a path from the radio transmission part which is connected with the selected antenna to the test function unit to perform the transmitter failure test.

6. An access point testing method for detecting a failure of an access point which has a plurality of sectors and performs radio communication with a radio access terminal in one of the sectors, wherein the access point comprises a test function unit that performs a function of a radio access terminal according to a control by an access point controller which controls the access point, wherein the access point testing method comprises:

receiving an instruction through a network;

establishing, using the function of the radio access terminal of the test function unit, a communication between the test function unit and the access point as though the radio access terminal of the test function unit exists within a coverage area of the access point;

selecting one antenna of the sector which is an object of the test designated from among a plurality of tests, in accordance with an antenna identification information which specifies the sector and the antenna of the object of the test and is included in the instruction of executing the test;

performing change-over control for the selected antenna, based on the test identification information, to select one of (a) a path that packets between the test function unit and the radio transmission part, or, between the test function unit and the radio reception part are transmitted and received passing through the directional coupler and the antenna and, (b) a path that packets between the test function unit and the radio transmission part, or, between the test function unit and the radio reception part are transmitted and received passing through the directional coupler and not passing through the antenna; and performing a failure detection of the access point based on information obtained by transmitting and receiving packets between the test function unit and the radio transmission part or the radio reception part through selected path, wherein when the test identification information included in the instruction of executing the test designates an antenna failure test, the method further comprises:

connecting the test function unit with the radio transmission part and the radio reception part which are connected with selected antenna, at a first timing after selecting one antenna of the sector which is the object of the test in accordance with the antenna identification information;

obtaining a first transmission power value of the radio access terminal side by using the function of the radio access terminal of the test function unit to establish a calling connection to an apparatus of a connection destination stored in advance and transmitting a packet;

connecting, at a second timing, the test function unit with the selected antenna;

obtaining a second transmission power value which is obtained by transmitting a packet using the function of the radio access terminal of the test function unit; and calculating a voltage surface wave ratio of the selected antenna based on the first and the second transmission power value to perform the antenna failure test, wherein when the test identification information included in the instruction of executing the test designates a receiver failure test, the method further comprises:

connecting the test function unit with the radio transmission part and the radio reception part which are connected with the selected antenna, after selecting one antenna of the sector which is the object of the test in accordance with the antenna identification information;

establishing a calling connection to an apparatus of a connection destination stored in advance and transmitting a packet by using the function of the radio access terminal of the test function unit;

calculating a packet error rate of a packet received by the radio reception part which is connected with the selected antenna and, based on the packet error rate, setting a transmission power value of the radio access terminal by performing transmission power control for the function of radio access terminal of the test function unit; and calculating a reception sensitivity of the radio reception part which is connected with the selected antenna based on the transmission power value and a path loss value of a path where a signal transmitted from the radio transmission part which is connected with the selected antenna returns the radio reception part via the test function unit to perform the receiver failure test, wherein when the test identification information included in the instruction of executing the test designates a transmitter failure test, the method further comprises:

after selecting one antenna of the sector which is the object of the test in accordance with the antenna identification information, connecting the test function unit with the radio transmission part which is connected with the selected antenna to set a path through which a transmission signal is transmitted from the radio transmission part which is connected with the selected antenna to the test function unit; and using the function of the radio access terminal of the test function unit, calculating a transmission power value of the access point based on a reception power value of the radio access terminal and a path loss value of the path from the radio transmission part which is connected with the selected antenna to the test function unit to perform the transmitter failure test.

* * * * *